(12) United States Patent
Phogat et al.

(10) Patent No.: US 11,551,384 B2
(45) Date of Patent: Jan. 10, 2023

(54) FLOW-BASED COLOR TRANSFER FROM SOURCE GRAPHIC TO TARGET GRAPHIC

(71) Applicant: Adobe Inc., San Jose, CA (US)

(72) Inventors: Ankit Phogat, Noida (IN); Vineet Batra, Delhi (IN); Sayan Ghosh, Chapel Hill, NC (US); Stephen DiVerdi, Berkeley, CA (US); Scott Cohen, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 52 days.

(21) Appl. No.: 17/323,086

(22) Filed: May 18, 2021

(65) Prior Publication Data
US 2021/0272331 A1 Sep. 2, 2021

Related U.S. Application Data

(63) Continuation of application No. 16/533,308, filed on Aug. 6, 2019, now Pat. No. 11,043,012.

(51) Int. Cl.
| | |
|---|---|
| *G06K 9/00* | (2022.01) |
| *G06T 11/00* | (2006.01) |
| *G06K 9/62* | (2022.01) |
| *G06T 7/90* | (2017.01) |

(52) U.S. Cl.
CPC ........ *G06T 11/001* (2013.01); *G06K 9/00523* (2013.01); *G06K 9/6223* (2013.01); *G06T 7/90* (2017.01)

(58) Field of Classification Search
CPC ..... G06T 11/001; G06T 7/90; G06T 2200/24; G06K 9/00523; G06K 9/6223; G06V 10/763; G06V 10/56

USPC .......................................................... 382/162
See application file for complete search history.

(56) References Cited

U.S. PATENT DOCUMENTS

| | | | |
|---|---|---|---|
| 6,351,557 B1 | 2/2002 | Gonsalves | |
| 6,606,166 B1 | 8/2003 | Knoll | |
| 2008/0089581 A1* | 4/2008 | Pitie | H04N 1/60 382/168 |
| 2009/0122075 A1 | 5/2009 | Park et al. | |

(Continued)

OTHER PUBLICATIONS

"Cielab Color Space", Wikipedia, Aug. 3, 2019, 10 pages.
(Continued)

*Primary Examiner* — Stephen P Coleman
(74) *Attorney, Agent, or Firm* — Kilpatrick Townsend & Stockton LLP

(57) ABSTRACT

Certain embodiments involve flow-based color transfers from a source graphic to target graphic. For instance, a palette flow is computed that maps colors of a target color palette to colors of the source color palette (e.g., by minimizing an earth-mover distance with respect to the source and target color palettes). In some embodiments, such color palettes are extracted from vector graphics using path and shape data. To modify the target graphic, the target color from the target graphic is mapped, via the palette flow, to a modified target color using color information of the source color palette. A modification to the target graphic is performed (e.g., responsive to a preview function or recoloring command) by recoloring an object in the target color with the modified target color.

20 Claims, 13 Drawing Sheets
(9 of 13 Drawing Sheet(s) Filed in Color)

(56) References Cited

U.S. PATENT DOCUMENTS

2012/0075329 A1     3/2012   Skaff et al.
2019/0279402 A1*   9/2019   Panetta .................. G06T 7/143

OTHER PUBLICATIONS

"Color Chameleon", Adobe Max, Youtube, Available online at: https://www.youtube.com/watch?v=m5U5nePn0vg, Nov. 8, 2016, 2 pages.

U.S. Appl. No. 16/533,308, Non-Final Office Action, dated Nov. 18, 2020, 9 pages.

U.S. Appl. No. 16/533,308, Notice of Allowance, dated Mar. 3, 2021, 9 pages.

Chang et al., "Palette-Based Photo Recoloring", Special Interest Group on Computer Graphics and Interactive Techniques, 2015, 11 pages.

Hitchcock, "The Distribution of a Product From Several Sources to Numerous Localities", Journal on Mathematics and Physics, vol. 20, Nos. 1-4, Apr. 1941, 2 pages.

Hu et al., "Expanding Color Query Results via Image Recoloring", Eurographics, 2017, 4 pages.

Nguyen et al., "Group-Theme Recoloring for Multi-Image Color Consistency", Computer Graph. Forum, vol. 36, No. 7, Oct. 2017, 10 pages.

Rubner et al., "A Metric for Distributions With Applications to Image Databases", International Conference on Computer Vision, 1998, 8 pages.

\* cited by examiner

1102

1104

1106

1108

FLOW-BASED COLOR TRANSFER FROM SOURCE GRAPHIC TO TARGET GRAPHIC

CROSS-REFERENCES TO RELATED APPLICATIONS

This application is a continuation of U.S. application Ser. No. 16/533,308 filed on Aug. 6, 2019, now allowed, which is incorporated by reference in its entirety.

TECHNICAL FIELD

This disclosure relates generally to creating or manipulating artificial images or other graphic objects. Specifically, the present disclosure involves flow-based color transfers from a source graphic to target graphic.

BACKGROUND

Graphics editing software is often used to create or modify digital visual content. These graphics editors are useful for generating creative content, such as artwork. Color schemes or themes provide a medium of expression in an artwork for an artist. A designer working on one piece of artwork could be influenced by a color theme from other artwork (e.g., photographs, moodboards, paintings, drawings, etc.), and may wish to replicate color theme from inspirational pieces in the artwork being created.

However, recoloring artwork can require extensive manual effort, particularly if the artwork being developed includes many different components. Examples of different components include different paths used to depict shapes in vector graphics, different layers in multi-layered images or graphics, etc. Additionally or alternatively, recoloring a particular piece of artwork with the color theme from a different piece of artwork could generate an aesthetically unpleasant result, such that the extensive manual effort involved in the recoloring process must be undone and further revised.

SUMMARY

Certain embodiments involve flow-based color transfers from a source graphic to target graphic. In some embodiments, a palette flow is computed that maps colors of a target color palette to colors of the source color palette. To modify the target graphic, the target color from the target graphic is mapped, via the palette flow, to a modified target color using color information of the source color palette. For instance, the palette flow could be computed by finding a set of flows, between the colors of the source color palette and a target color of the target color palette, that minimizes an earth-mover distance between a target color distribution of the target color palette and a source color distribution of the source color palette. In a recoloring operation using a modified target color, the modified target color is computed from a weighted combination of source colors from the source color palette. In one example, the set of weights in this weighted combination is the set of flows between the colors of the source color palette and the target color. In another example, the set of weights in this weighted combination is a normalized version of the set of flows between the colors of the source color palette and the target color. A modification to the target graphic is performed by recoloring an object in the target graphic with the modified target color.

In additional or alternative embodiments, color palettes used in flow-based color transfers are extracted from a vector graphic image (e.g., a vector graphic). For instance, a target vector graphic can have path data identifying shapes and colors. Extracting a target color palette from the target vector graphic may involve, among other steps, determining a shape from the path data, identifying the target color that is associated with the shape via the path data, and computing a respective weight for the target color within the target color palette based on the shape. For instance, a palette-extraction process could iterate through each shape in a target vector graphic. If a given shape has not been encountered in a previous iteration, the shape's color is added to the target color palette and a weight of the color is added to the target color palette based on how much of the target vector graphic is occupied by the shape under consideration. If the shape has been encountered in a previous iteration, the weight of the color within the target color palette may be increased based on how much of the target vector graphic is occupied by the shape under consideration. The extracted target color palette, as well as one or more source color palettes, can be used to compute one or more palette flows.

In additional or alternative embodiments, a workflow for performing flow-based color transfers is provided. For instance, a recoloring tool of a graphics manipulation application retrieves a set of source graphics and displays the set of source graphics along with a target graphic. Palette flows are computed for the target graphic and the source graphics. If a particular source graphic is selected, the recoloring tool uses a particular palette flow for a corresponding source color palette to generate a preview of a recolored target graphic, to perform a recoloring operation, or both. The recolored target graphic of the preview or the recoloring operation is generated by changing color information in the target graphic into color information from the source color palette.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
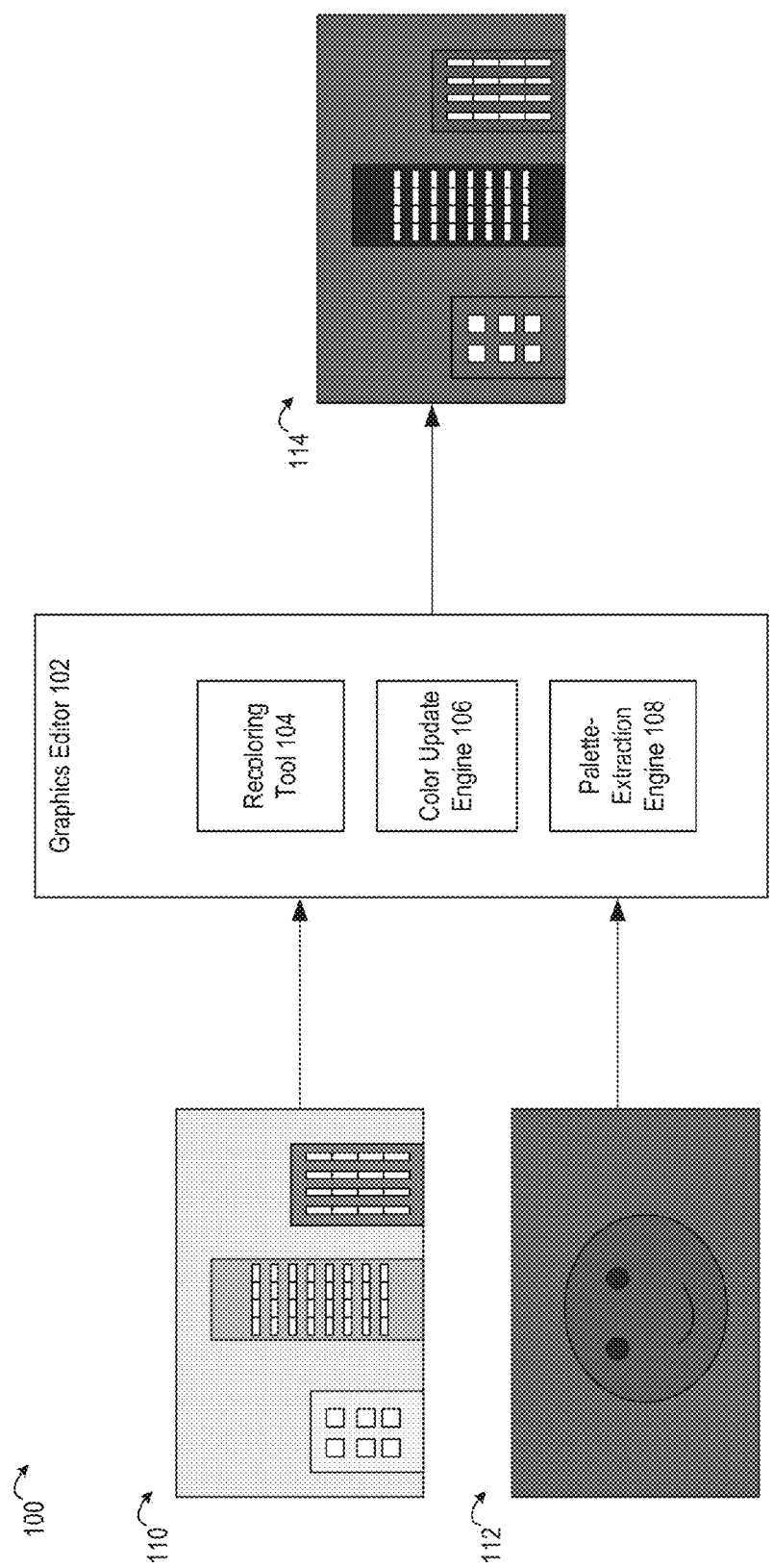
FIG. 1 depicts an example of a computing environment for performing flow-based color transfers from a source graphic to a target graphic, according to certain embodiments of the present disclosure.

The present disclosure involves flow-based color transfers from a source graphic to target graphic. For instance, color information is transferred from a source graphic to a target graphic using a palette flow, which maps colors of the source graphic to corresponding colors of the target graphic. In one example, a graphics editor provides a recoloring workflow in which color palettes are extracted from a target graphic being edited and from one or more source graphics having color combinations that a user wishes to apply to the target graphic. In the workflow, the graphics editor uses the extracted color palettes to compute a transfer function that provides a mapping (i.e., a palette flow) between colors of a source graphic and colors of the target graphic. In some cases, the computation of this palette flow is controlled by one or more user-specified configuration settings, such as settings for including or excluding luminance values when performing the flow computation, including or excluding certain background colors when performing the flow computation, modifying color densities within a palette, etc. The graphics editor uses the computed palette flow to modify colors of the target graphic to match (or more closely resemble) colors of the source graphic.

The following non-limiting examples are provided to introduce certain embodiments. In these examples, a graphics editor is used to implement a recoloring workflow for a target graphic using a source graphic. The target graphic and the source graphic need not have the same semantic content. For instance, the target graphic could depict a scene of a neighborhood on a snowy day, whereas the source graphic could depict a whale swimming in an aquarium. A user may wish to change the color scheme of this target graphic, which might include predominantly orange and red coloring, to more closely resemble the color scheme of the source graphic, which might include predominantly blue and yellow coloring. To implement this change, the graphics editor computes a palette flow that maps colors of a target color palette from the target graphic to colors of a source color palette from the source graphic. Each of these color palettes includes a set of colors that occur within the graphic, along with weights indicating respective densities of the colors within the color palette (e.g., how much of the graphic includes content having a particular color).

In one example, the palette flow indicates that certain weighted combinations of colors in the source graphic are used to replace colors in the target graphic. For instance, in the scenario above, the palette flow indicates that different shades of blue in the aquarium scene are to be mapped, via a weighted combination of these blue colors, to an orange color in the neighborhood scene. The graphics editor modifies the target graphic by changing target color information from the target color palette graphic into color information from the source color palette. For instance, the graphics editor recolors all orange objects in the neighborhood scene to have a weighted combination of blue colors from the aquarium scene.

In some embodiments for implementing such an example, the graphics editor computes the palette flow by modelling differences between the target color palette and the source color palette as a flow-optimization problem. For instance, the graphics editor models the target color palette and the associated densities of its colors as a target color distribution. Similarly, the graphics editor models the source color palette and the associated densities of its colors as a source color distribution. The flow-optimization problem involves determining how to change the source color distribution into the target color distribution. In the flow-optimization problem, changing the source color distribution into the target color distribution involves modeling a movement of a certain amount of mass along a distance between a first point in a color space, such as a first set of L*a*b* color space values, and a second point in the color space, such as a second set of L*a*b* color space values. In this scenario, the modeled "mass" is referred to as a "flow" between a first color, which is defined by the first set of L*a*b* color space values, and a second color, which is defined by the second set of L*a*b* color space values. In one example, solving the flow-optimization involves minimizing, subject to certain constraints, an earth-mover distance, where the earth-mover distance is an amount of work (i.e., a sum of products of the flows and distances discussed above) involved in changing the source color distribution into the target color distribution. The graphics editor determines a set of flows between the source color distribution and the target color distribution that minimize the earth-mover distance without violating these constraints. The resulting set of flows are included in the palette flow and are therefore used by the graphics editor to recolor the target graphic.

In some embodiments, which involve target graphics that are vector graphics, the graphics editor leverages attributes specific to vector graphics in order to extract a target color palette used in the recoloring workflow described above. For instance, a target vector graphic includes path data. This path data specifies a shape of a path within the target vector graphic (e.g., parameters defining a rectangle, a circle, etc.)

and color information for the path (e.g., stroke color, fill color, etc.). The graphics editor uses the color information of the path data to identify a set of colors for the target color palette, examples of which are described below. The graphics editor also uses the specified shapes of paths to compute densities (and associated weights) of these colors in the target color palette.

Utilizing parameter values from a vector graphic can provide processing efficiencies in the recoloring workflow. In one example, if a path has a solid fill color, the graphics editor can select the specified fill color for the target color palette. Simply selecting the value of the "fill" parameter allows the graphics editor to identify this palette color more quickly than, for example, techniques that require evaluating each pixel in a graphic to determine which colors should be included in the target color palette. In another example, if a path has a shading construct in which color values gradually change across the face of the path (e.g., transitioning from a red to a blue color to provide a shaded purple appearance), the graphics editor identifies discrete colors that define the shading construct (i.e., the "red" and "blue" colors). The graphics editor uses these identified discrete colors to guide a clustering process that determines the palette colors. For instance, the graphics editor performs a k-means clustering process on pixels' color values and selects a set of colors corresponding to the centers of the resulting clusters as the target color palette. In the k-means clustering process, the cluster centers are initially set to the discrete colors from the shading construct of the target vector graphic. Providing this guidance allows the k-means clustering process to converge more quickly.

In additional or alternative embodiments, the graphics editor includes a user-facing recoloring interface, which allows a user to configure different attributes of the workflow described above, to preview the results of applying the workflow to different source graphics, or both. For instance, the graphics editor could present, within a recoloring interface, a target graphic and a set of source graphics retrieved from different data sources (e.g., online repositories, local directories, etc.). If the graphics editor receives a selection of a given source graphic, the graphics editor responds to this selection by creating a preview of a recolored target graphic. The recolored target graphic is generated using a palette flow that is computed for the selected source graphic, thereby allowing a user to assess the aesthetic quality (e.g. coherence, consistency, etc.) of the recolored target graphic.

In this example, the graphics editor computes different palette flows for the different source graphics. In some cases, a palette flow computation is modified based on certain user preferences. For instance, the recoloring interface could include an option for a user to modify the densities (i.e., weights) in a source color palette, a target color palette, or both. The flow optimization process described above involves minimizing an objective function subject to certain constraints that correspond to weights in one or more of these color palettes. Thus, user-specified changes to these weights result in changes to the flow-based color transfer (e.g., increasing the density of a particular source color within a recolored target graphic).

Furthermore, in some instances of a palette extraction process, the graphics editor uses inputs received via the recoloring interface to exclude certain colors (e.g., background colors that heavily predominate) or color information (e.g., luminance values that might change a "daytime" scene into a "nighttime" scene if included in a source color palette) from the palette extraction process. Efficiencies provided by certain palette-extraction techniques described above can allow this recoloring process to be performed with minimal or unnoticeable delay (e.g., a few milliseconds).

Certain embodiments provide improvements to computing systems used for generating or editing creative content or other graphical content. For instance, existing techniques often entail cumbersome or time-consuming processes for transferring a color scheme from a source graphic to another graphic. These cumbersome or time-consuming processes can be mitigated by one or more features described herein. For instance, interface features for configuring the operation of a recoloring process can allow designers or other users to control various aspects of the recoloring process (e.g., transfer of luminance values, background colors, etc. if desirable). In another example, interface features for previewing the results of a recoloring process could enable a designer to visualize color transfers from a set of different source graphics in a single preview, thereby allowing for quick color exploration of vector art. In some cases, various combinations of these features provide an intuitive, end-to-end tool for assessing and implementing modifications to color combinations in a target graphics to more closely match the color used in different source graphics.

Referring now to the drawings, FIG. 1 depicts an example of a computing environment 100 in which a graphics editor 102 is used for performing flow-based color transfers from a source graphic 112 to a target graphic 110. In this example, the source graphic 112, which is a digital file including one or more images or other graphics, provides a source of color information for a color transfer. The target graphic 110 is a digital file that includes one or more images or other graphics being edited within the computing environment 100. For instance, a user that is a designer may wish to use a color theme from a source graphic 112 (e.g., artwork, a photograph, or a moodboard) and use this color theme as an inspiration for a design that is depicted in the target graphic 110. The designer uses the graphics editor 102 to transfer this color theme from the source graphic 112 to the target graphic 110, thereby generating a recolored target graphic 114. The recolored target graphic 114 retains the semantic content of the target graphic 110, such as the depicted buildings, and has a color scheme that is derived from the source graphic 112. For instance, the color scheme of the recolored target graphic 114 can include a set of colors that are different weighted combinations of colors from the source graphic 112.

In some embodiments, a target graphic 110, a source graphic 112, or both are represented as vector graphics. A vector graphic can be organized as a set of paths having attributes such as stroke color, fill color, etc. For example, in some vector graphics, the geometry of various shapes is modelled by bounded cubic Bezier splines. Such shapes are filled using solid colors (e.g., red, green, blue) or shading constructs that identify a set of discrete colors and a manner of deriving other colors from the discrete colors, such as linear or radial gradients that cause a display of color values that transition from a first discrete color of the shading construct to a second discrete color of the shading construct.

The graphics editor 102 includes one or more software tools or engines. Each software tool or engine includes program code executable by one or more processing devices to perform operations described here. Examples of this program code include program code for rendering content for display, program code for creating graphical interfaces (e.g., the interfaces depicted in FIGS. 3, 4, and 7) having instances of event listeners or other suitable objects for receiving input from input devices (e.g., a mouse, a touchscreen, etc.), program code for modifying color information for pixels or other objects included in a graphic, etc. In the example depicted in FIG. 1, the graphics editor 102 includes a recoloring tool 104, a color-update engine 106, and a palette-extraction engine 108.

The recoloring tool 104 provides one or more user interface features having functions that control how recoloring operations are performed. For instance, the recoloring tool 104 can configure a display device to present a recoloring interface that allows users to preview, assess, and modify different variations in colors of the target graphic 110 using one or more source graphics 112. In the example of FIG. 1, the recoloring tool 104 receives commands and other inputs from a user that can transfer a color theme (e.g., the use of red, dark blue, and purple coloring) of the source graphic 112 to the semantic content (e.g., a scene depicting different buildings) of the target graphic 110. The recoloring tool 104 communicates with the color-update engine 106 and the palette-extraction engine 108 to effect this color transfer.

For instance, the color-update engine 106 performs one or more operations that generate a mapping between a source color palette of the source graphic 112 and a target color palette of the target graphic 110. Such a mapping indicates, for example, that a first color from the source graphic 112 is mapped to a second color from the target graphic 110. The color-update engine 106 can use the mapping to modify color information (e.g., pixel data, "fill" color, etc.) for an object from the target graphic 110. For instance, if an object in the target graphic 110 has the second color, and the second color is mapped to the first color from the source graphic 112, the color-update engine 106 generates a recolored target graphic 114 by updating the object in the target graphic 110 to have the second color. In the simplified example depicted in FIG. 1, this recoloring process involves changing a lightly colored orange building depicted in the target graphic 110 into a dark blue building depicted in the recolored target graphic 114.

In some embodiments, the color-update engine 106 generates a mapping by determining parameters of a transfer function. The transfer function indicates how to transform a distribution of colors found in the source graphic 112 into a distribution of colors found in the target graphic 110. A distribution of colors includes colors from a graphic's color palette (e.g., colors defining a color theme depicted in the graphic) and associated densities of the colors. In a simplified example, a density for a particular color in a graphic could be a proportion of the graphic, as rendered, that includes that particular color. The color-update engine 106 computes parameters of the transfer function by modeling, as a flow-optimization problem, the transformation of a source graphic's color distribution into a target graphic's color distribution. Solving the flow-optimization problem involves determining flows from source colors to target colors, e.g., determining which weighted combinations of source colors result in a given target color, or vice versa.

In some embodiments, the graphics editor 102 uses the palette-extraction engine 108 to extract a target color palette from the target graphic 110, a source color palette from the source graphic 112, or both. A palette-extraction process involves identifying unique colors of a target graphic 110 or a source graphic 112. Examples of identifying unique colors include identifying pixel values of a graphic as rendered, identifying fill colors of a vector graphic, identifying discrete colors used to define a gradient in a vector graphic, or some combination thereof. A palette-extraction process also involves identifying respective densities of colors in the palette.

Example of a Workflow for Performing Flow-Based Color Transfers

Figure 2:
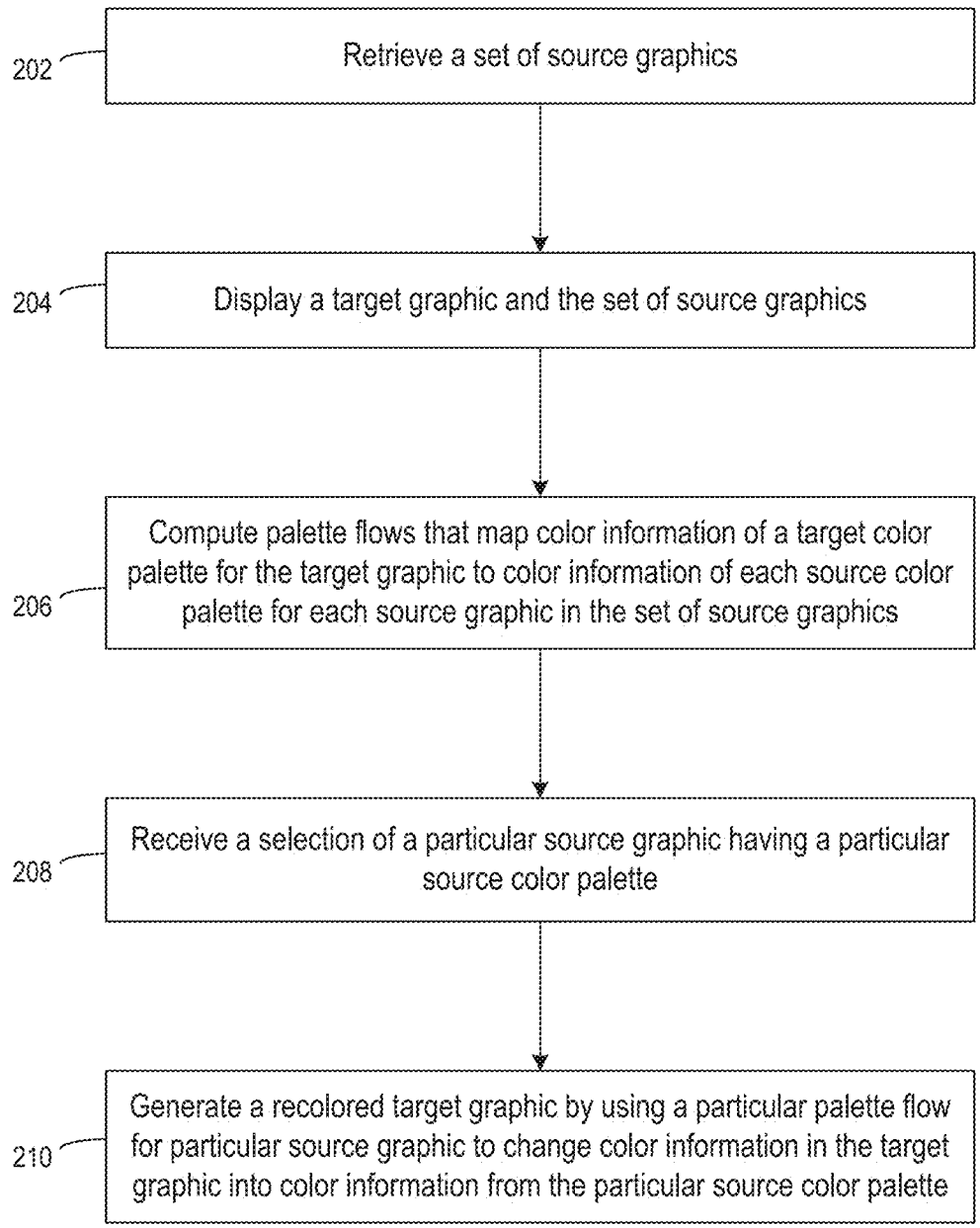
FIG. 2 depicts an example of a process for executing a workflow that uses one or more flows computed from source and target color palettes to transfer color information from a source graphic to a target graphic using the computing environment of FIG. 1, according to certain embodiments of the present disclosure.

FIG. 2 depicts an example of a process 200 for a workflow that uses one or more palette flows computed from source and target color palettes to transfer color information from a source graphic to a target graphic. One or more operations described with respect to FIG. 2, as well as associated examples from one or more of FIGS. 1 and 3-7, can be used to implement a step for executing a workflow in which a palette flow between a source color palette and a target color palette is used to transfer color information from a source graphic to a target graphic. In some embodiments, one or more computing devices implement operations depicted in FIG. 2 by executing suitable program code (e.g., the recoloring tool 104 or another engine of the graphics editor 102). For illustrative purposes, the process 200 is described with reference to certain examples depicted in the figures. Other implementations, however, are possible.

At block 202, the process 200 involves retrieving a set of source graphics. For instance, a recoloring tool 104 (or another tool of the graphics editor 102) could configure a processing device to retrieve one or more source graphics from a non-transitory computer-readable medium. In various embodiments, this non-transitory computer-readable medium is local to a computing device that includes the processing device or is included in a remote computing system accessible over a data network.

In some embodiments, the recoloring tool 104 accesses one or more source graphics from an online repository. For instance, an online repository could store artwork images, or other source graphics or target graphics that are accessible by a user of the computing environment 100. The online repository could store different artwork of various categories and can provide a search capability for retrieving certain graphics based on tags applied to the graphics. If a user, such as an artist, wishes to follow the coloring style of an expert designer for inspiration, the user can instruct the recoloring tool 104 to retrieve graphics generated by the designer from a portfolio.

Figure 3:
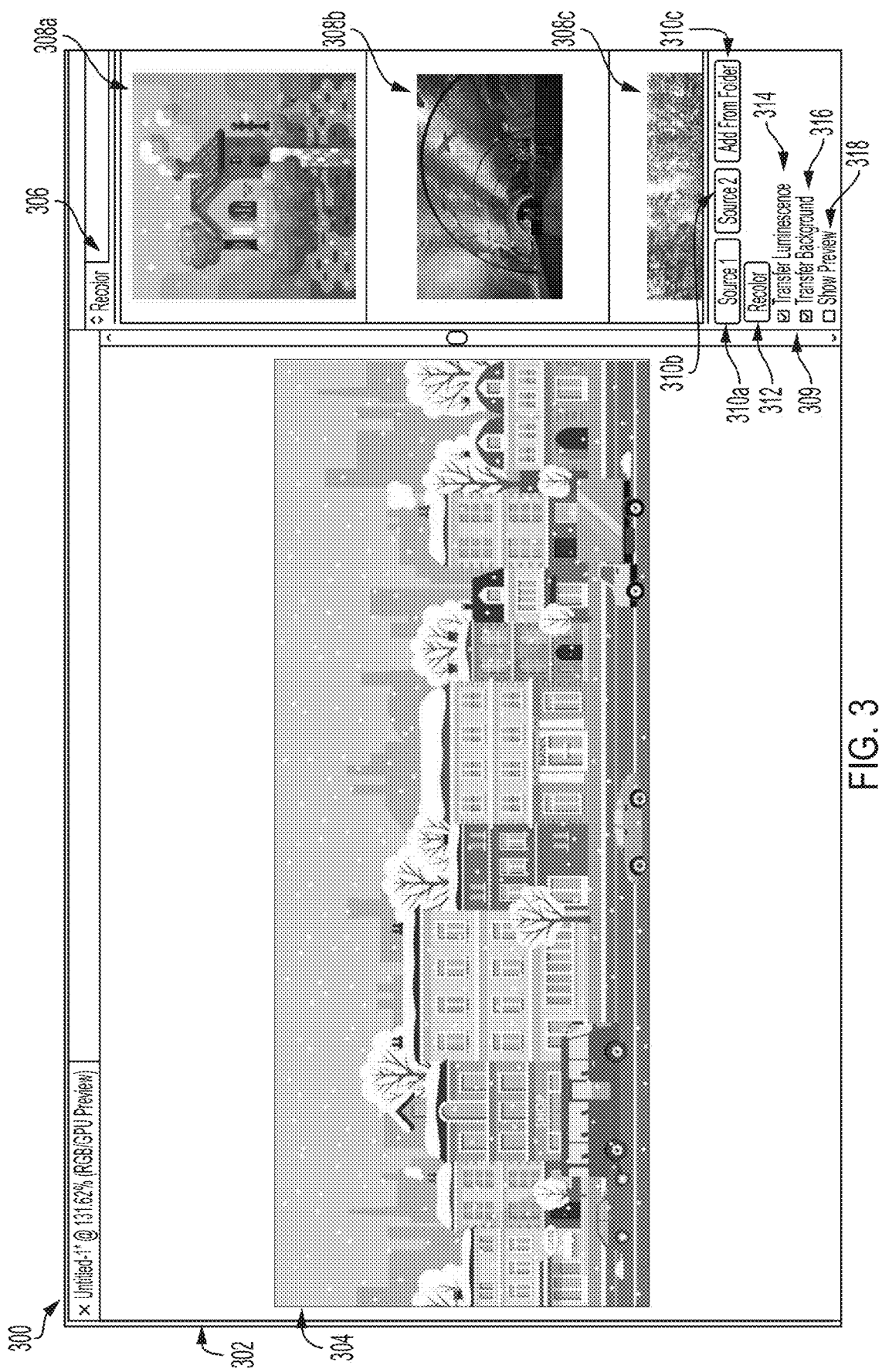
FIG. 3 depicts an example of a recoloring interface that is used for executing recoloring workflows such as the process of FIG. 2, according to certain embodiments of the present disclosure.

FIG. 3 depicts an example of a recoloring interface 300 that is used for executing recoloring workflows. In this example, the recoloring interface 300 includes a target display region 302 for displaying a target graphic 304, a source display region 306 for displaying one or more source graphics 308a-c, and a tool selection region 309. The tool selection region 309 includes various control elements. For instance, in FIG. 3, the tool selection region 309 includes graphics-selection interface elements 310a-c, a recoloring command interface element 312, a luminance-control interface element 314, a background-control interface element 316, and a preview control element 318.

The recoloring interface 300 is configured to receive one or more inputs that are used for implementing block 202. If the recoloring tool 104 receives a selection of one or more of the graphics-selection interface elements 310a-c, the recoloring tool 104 responds to the selection by presenting a window, a pane, or other interface element for browsing source graphics. For instance, a selection of the graphics-selection interface elements 310a and 310b causes the recoloring tool 104 to present a window or other interface element for browsing different online repositories. Similarly, a selection of the graphics-selection interface element 310c causes the recoloring tool 104 to present a window or other interface element for browsing a directory located on a non-transitory computer-readable medium that is accessible to the graphics editor 102.

Returning to FIG. 2, at block 204, the process 200 involves displaying a target graphic and the set of source graphics. For instance, in the example of FIG. 3, a recoloring tool 104 (or another tool of the graphics editor 102) updates a target display region 302 to depict a target graphic 304. The recoloring tool 104 (or another tool of the graphics editor 102) also updates a source display region 306 to depict various source graphics 308a-c, which can be source graphics that are selected using one or more graphics-selection interface elements 310a-c.

At block 206, the process 200 involves computing palette flows that map color information of a target color palette for the target graphic to color information of each source color palette for each source graphic in the set of source graphics. For instance, a recoloring tool 104 (or another tool of the graphics editor 102) can request or instruct a color-update engine 106 to compute flows for each source graphic that has been selected via the recoloring interface 300. Examples of computing these flows are described herein with respect to FIG. 5.

At block 208, the process 200 involves receiving a selection of a particular source graphic having a particular source color palette. For instance, a recoloring tool 104 (or another tool of the graphics editor 102) receives one or more selection inputs via the source display region 306. A selection input can indicate that a user wishes to explore a color variation that involves transferring color information from a source color palette to a target graphic 304.

Blocks 206 and 208 can be performed in any suitable order. In some embodiments, the graphics editor 102 can compute palette flows for source graphics responsive to the source graphics being selected for display within the recoloring tool 104 (i.e., block 206 can occur before block 208). In additional or alternative embodiments, the graphics editor 102 can compute palette flows for source graphics responsive to a preview or recoloring command being selected within the recoloring tool 104 (i.e., block 206 can occur after block 208).

At block 210, the process 200 involves generating a recolored target graphic by using a particular palette flow for a particular source graphic to change color information in the target graphic into color information from the particular source color palette. For instance, a recoloring tool 104 (or another tool of the graphics editor 102) can respond to the selection received at block 208 by modifying color values in a target graphic. This modification causes the target graphic to include color values from a source color palette associated with a selected source graphic (e.g., one or more of the source graphics 308a-c selected via the recoloring interface 300). In some embodiments, modifying color values in a target graphic involves updating color data in a target vector graphic, such as modifying a "fill" parameter in a path object so that the fill color for the path object is a color from the source color palette rather than the color from the initial target graphic. In additional or alternative embodiments, modifying color values in a target graphic involves updating pixel values in, for example, a target raster graphic so that the pixel values are taken from the source color palette.

In some embodiments, generating a recolored target graphic involves modifying a copy of the target graphic used in a preview function of the graphics editor 102. For instance, the recoloring interface 300 in the example of FIG. 3 includes a preview control element 318, such as a check-box. If the recoloring tool 104 receives an input to the preview control element 318 indicating that a preview of the recolored target graphic should be displayed, the recoloring tool 104 can update the recoloring interface 300 to depict the preview.

Figure 4:
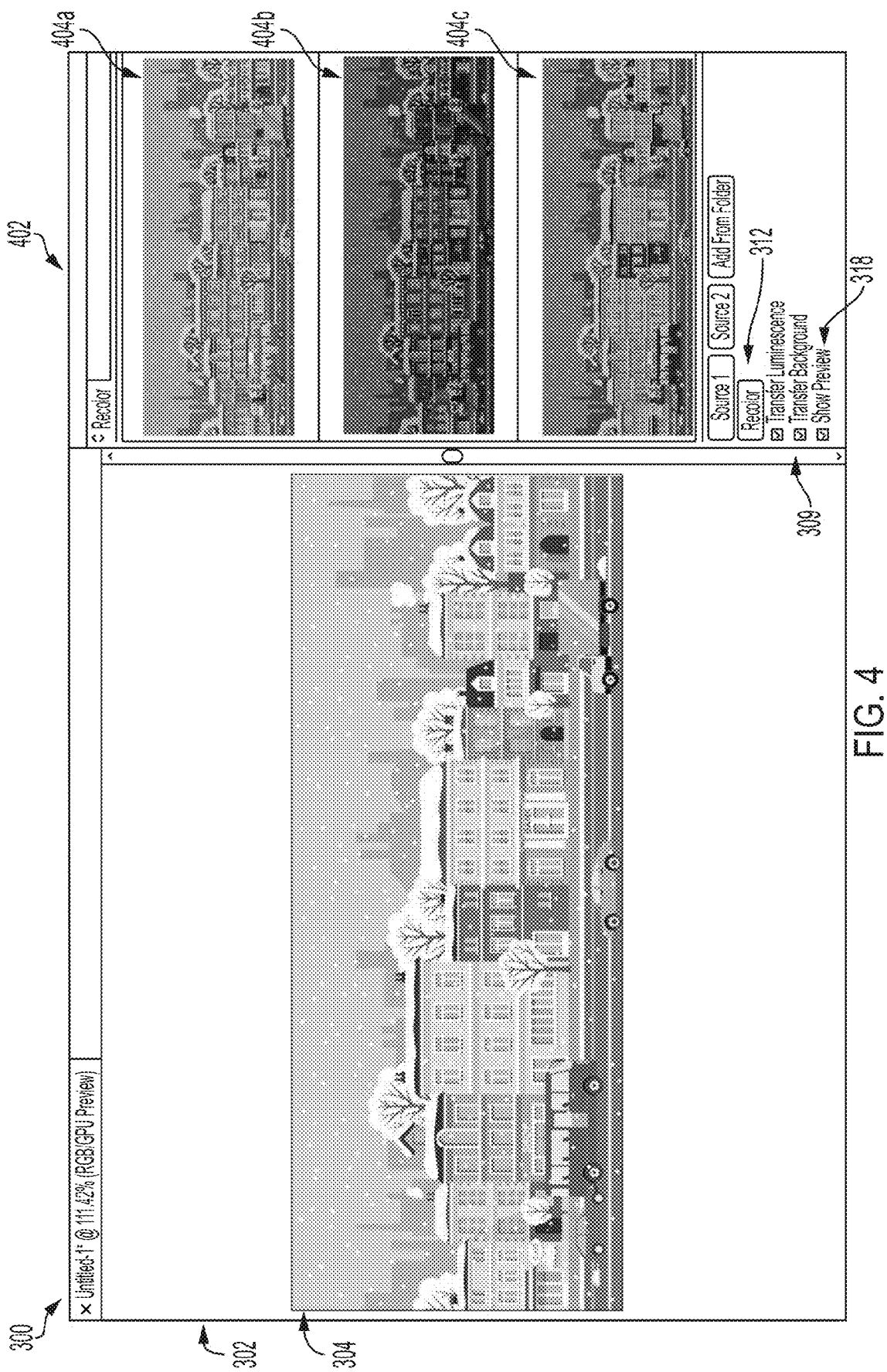
FIG. 4 depicts an example in which the recoloring interface from FIG. 3 has been updated to display previews of a recolored target graphic, according to certain embodiments of the present disclosure.

FIG. 4 depicts an example in which the recoloring interface 300 has been updated in this manner. In this example, the source display region 306 has been replaced with a preview region 402. The preview region 402 displays a recolored target graphic 404a that is a copy of the target graphic 304 that has been modified to include color information from a source color palette of the source graphic 308a. The preview region 402 also displays a recolored target graphic 404b that is a copy of the target graphic 304 that has been modified to include color information from a source color palette of the source graphic 308b. The preview region 402 also displays a recolored target graphic 404c that is a copy of the target graphic 304 that has been modified to include color information from a source color palette of the source graphic 308c. In this manner, a user can see an in-window preview of the target graphic 304 that has been re-colored using each of the selected source graphics by simply clicking a "Preview" button. This in-window preview can allow a user to assess the resulting recoloring of the target graphic 304 using these source graphics. Thus, a preview function such as the one depicted in FIG. 4 could enable a designer to visualize color transfers from a set of different source graphics in a single preview, thereby allowing for quick color exploration of vector art.

In additional or alternative embodiments, generating a recolored target graphic to the target graphic involves creating a modified target graphic that is outputted by the graphics editor 102. For instance, a recoloring tool 104 can receive a recoloring command, such as a user input to a recoloring command interface element 312. The recoloring tool 104 can respond to the recoloring command by applying color information from the source color palette to the target graphic. Applying color information from the source color palette to the target graphic includes changing target color information in the target graphic to include source color information from a source color palette. The recolored target graphic and its corresponding original target graphic can have the same semantic content. In particular, the recoloring process can be performed without modifying the geometry of some or all of the objects depicted in each of the target graphics.

A workflow such as the process described with respect to FIG. 2 can be augmented with more detailed controls. In some embodiments, the recoloring tool 104 includes a luminance control that allows users to control whether luminance values are transferred from a source graphic to a target graphic. The luminance control can be useful if, for example, a source graphic and a target graphic have significant differences with respect to brightness, contrast, or both. For example, the user may be working on a target graphic with a bright illustration (suggesting that the illustration is set in daytime), while the source graphic might have a dark setting (suggesting a night setting). If the user wants to preserve the original theme of the target graphic, the user can choose not to transfer luminance values, while transferring only the chroma values.

In such embodiments, the recoloring tool 104 can represent colors of a source graphic in an L*a*b* color space, where a given color is represented as a color vector having a luminance vector element (L*) and vector elements for the a* and b* channels. The luminance vector element identifies a luminance value. The recoloring tool 104 can be configured to include or exclude such luminance values when computing flows. In the example of FIGS. 3 and 4, the luminance-control interface element 314 can be used to select these configurations. For instance, if the recoloring tool 104 receives a user input to the luminance-control interface element 314 (e.g., selecting or de-selecting a checkbox), the recoloring tool 104 can respond to the user input by modifying a luminance control setting of the graphics editor 102. If the luminance control setting indicates that luminance values should be excluded from a palette-extraction process, the recoloring tool 104 can cause a palette-extraction engine 108 to apply a palette-extraction process to color vectors of a source graphic in a manner that excludes the luminance vector element. If the luminance control setting indicates that luminance values should be included in a palette-extraction process, the recoloring tool 104 can cause a palette-extraction engine 108 to apply a palette-extraction process to color vectors of a source graphic in a manner that includes the luminance vector element.

In additional or alternative embodiments, the recoloring tool 104 can include a background control that allows users to control whether color values of background colors in a source graphic are transferred from the source graphic to a target graphic. The background control can be useful in cases where, for example, a background color is present in abundance (e.g., as a backdrop of a depicted scene, such as the purple color in source graphic 112 of FIG. 1) and therefore dominates colors in the source graphic that occur less frequently, but are intended to characterize the source graphic (e.g., the red and blue colors of the smiling face in source graphic 112 of FIG. 1). In other cases, the target graphic or the source graphic may not have a clear background and excluding the background color of the source graphic may provide more soothing results when recoloring the target graphic.

To implement such a background control, the recoloring tool 104 can present a background-control interface element in a recoloring interface. For instance, in FIG. 3, the recoloring interface 300 includes a background-control interface element 316, which is a checkbox. If the recoloring tool 104 receives a user input to the background-control interface element 316 (e.g., selecting or de-selecting the checkbox), the recoloring tool 104 can respond to the user input by modifying a background control setting of the graphics editor 102. If the background control setting indicates that background values should be excluded from a palette-extraction process, the recoloring tool 104 can cause a palette-extraction engine 108 to apply a palette-extraction process that ignores, discards, or otherwise excludes color data corresponding to background colors. If the background control setting indicates that background colors should be included in a palette-extraction process, the recoloring tool 104 can cause a palette-extraction engine 108 to apply a palette-extraction process to a source graphic in a manner that includes one or more background colors.

A color can be identified as a background color in any suitable manner. In some embodiments, the graphics editor 102 presents one or more options for a user to identify a particular color as a background color, such as presenting an interface element with color samples and allowing a user to select which of the colors are background colors. In additional or alternative embodiments, the graphics editor 102 automatically identifies background colors, or suggests that certain colors are background colors, based on their density within a graphic. For instance, the graphics editor 102 could identify, as a background color, a color having the highest density within a graphic or a set of colors with the highest densities within the graphic. In some cases, the graphics editor 102 solicits user input to confirm that such an automatically identified background color should be classified as a background color.

In some embodiments, modifying a luminance control setting, a background control setting, or both can cause one or more operations of the process 200 to be repeated. For instance, if the graphics editor 102 receives input modifying one of these control settings, the recoloring tool 104 can return to block 206 of the process 200 and re-compute flows that map one or more target color palettes to one or more source color palettes. Re-computing a flow could involve performing a palette-extraction process with the modified control setting, e.g., changing an initial source color palette that is extracted using a first luminance or background control setting into a different source color palette that is extracted using a second luminance or background control setting. Additionally or alternatively, re-computing a flow could involve modifying an initial source color palette having a background color by removing the background color from the initial source color palette, without repeating the palette-extraction process.

Example of a Process for Implementing Flow-Based Color Transfers

Figure 5:
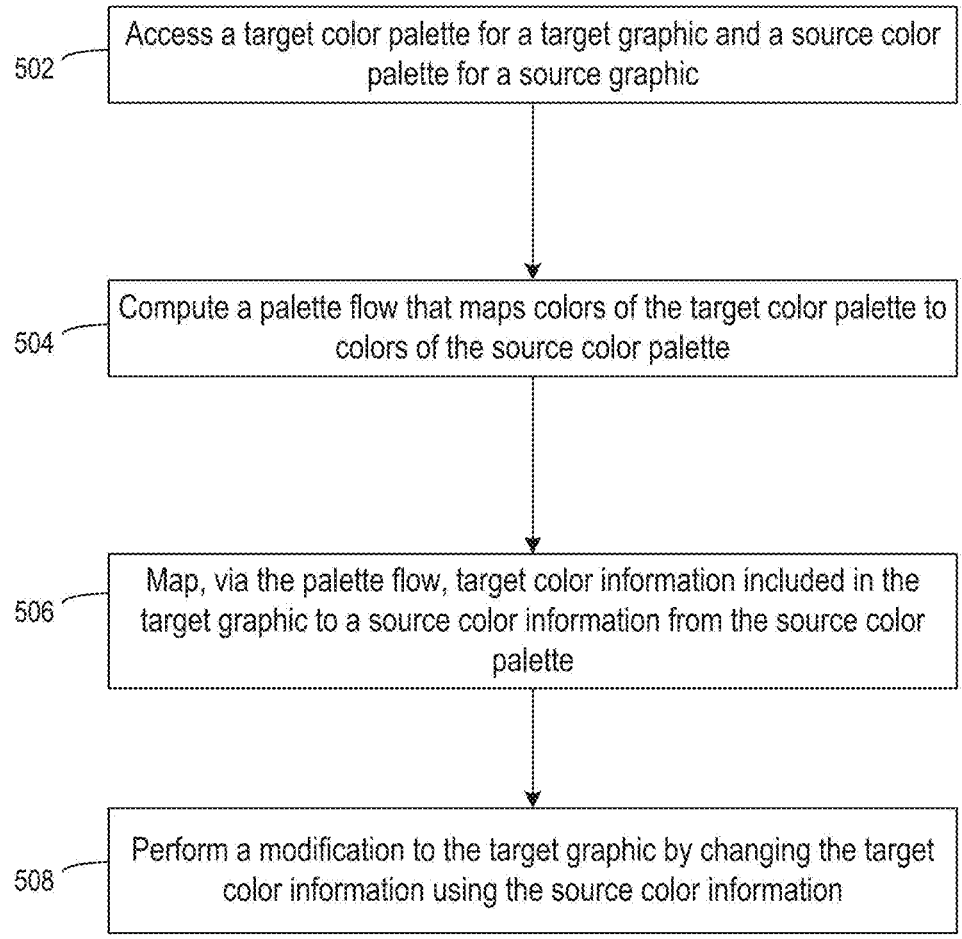
FIG. 5 depicts an example of a process for performing a flow-based color transfer from a source graphic to target graphic using the computing environment of FIG. 1, according to certain embodiments of the present disclosure.

Any suitable process can be used to implement a flow-based color transfer that recolors a target graphic based on colors of a source graphic. For instance, FIG. 5 depicts an example of a process 500 for performing a flow-based color transfer from a source graphic to target graphic. One or more operations described with respect to FIG. 3, as well as associated examples from one or more of FIGS. 1, 2, and 4-7, can be used to implement a step for computing a palette flow that maps color information of a target color palette for the target graphic to color information of a source color palette for a source graphic. In some embodiments, one or more computing devices implement operations depicted in FIG. 5 by executing suitable program code (e.g., the color-update engine 106 or another engine of the graphics editor 102). For illustrative purposes, the process 500 is described with reference to certain examples depicted in the figures. Other implementations, however, are possible.

At block 502, the process 500 involves accessing a target color palette for a target graphic and a source color palette for a source graphic. For instance, the color-update engine 106 can configure a processing device to retrieve one or more source color palettes and one or more target color palettes from a non-transitory computer-readable medium, which could be local to a computing device that includes the processing device or included in a remote computing system accessible over a data network. In some embodiments, the graphics editor 102 performs one or more palette-extraction processes that are used to automatically compute the target color palette, the source color palette, or both. Examples of these palette extraction processes are described herein with respect to FIG. 6. The graphics editor 102 stores the automatically computed target color palette, the automatically computed source color palette, or both.

At block 504, the process 500 involves computing a palette flow that maps colors of the target color palette to colors of the source color palette. For instance, the color-update engine 106 determines parameters of a transfer function that maps a distribution of colors in the source graphic to a distribution of colors in the target graphics.

In some embodiments, a palette flow includes flows that are computed based on an amount of work required to transform a target color distribution of the target color palette into a source color distribution of the source color palette. For instance, computing the palette flow could involve minimizing an earth-mover distance between a target color distribution of the target color palette and a source color distribution of the source color palette. Computing an earth-mover distance can involve computing the amount of work required to change the source color distribution into the target color distribution. For instance, the work contributed to the earth-mover distance by a source color and a target color is modeled as a movement of a certain amount of mass along a distance between a first point in a color space, such as a first set of L*a*b* color space values defining a target color, and a second point in the color space, such as a second set of L*a*b* color space values defining a source color. In this scenario, the modeled "mass" is referred to as a "flow" between the target color, which is defined by the first set of L*a*b* color space values, and the source color, which is defined by the second set of L*a*b* color space values.

A palette flow can include a set of these flows that are computed using the earth-mover distance. Certain flows between a given target color and multiple source colors are used to compute a weighted combination of the source colors that can be used to replace the target color. Using the earth-mover distance can, in some cases, result in improved coherence being maintained after a color transfer, and can also add robustness in cases where there is a large difference between the distribution of colors within the source graphic color distribution and the distribution of colors within the target graphic. Thus, certain embodiments using this type of flow computation can generate recolored target graphics that have a high aesthetic quality.

In one example, the graphics editor 102 minimizes an earth-mover distance subject to one or more constraints. Examples of these constraints include requiring a sum of flows for a target color in the target color palette to be less than or equal to a weight of the target color in the target color distribution, requiring a sum of flows for a source color in the source color palette to be less than or equal to a weight of the source color in the source color distribution, or some combination thereof.

In additional or alternative embodiments, minimizing the earth-mover distance involves minimizing an objective function. For example, each color palette used in block 504 includes a set of colors that occur within the graphic, along with weights indicating respective densities of the colors within the color palette (e.g., how much of the graphic includes content having a particular color). The graphics editor 102 can compute a total target weight that is a sum of weights of the colors in the target color palette. The graphics editor 102 can also compute a total source weight that is a sum of weights of the colors in the source color palette. The graphics editor 102 can select a total flow constraint that is a minimum of the total target weight and the total source weight.

Continuing with this example, graphics editor 102 can access, from a non-transitory computer-readable medium used by the graphics editor 102, an objective function. The objective function could include a weighted summation of distances with respect to the colors of the target color palette and the colors of the source color palette, where the distances are weighed by flows with respect to the colors of the target color palette and the colors of the source color palette. For instance, each term of the weighted summation could include a distance that is weighted with a flow, where the distance is a distance between a pair of colors from the target color palette and the source color palette and the flow is a flow between that pair of colors.

In this example, the graphics editor 102 can determine, subject to a set of constraints, the flows that minimize the objective function. The set of constraints can include the sum of flows for the target color in the target color palette being less than or equal to the weight of the target color in the target color distribution. The set of constraints can also include the sum of flows for the source color in the source color palette being less than or equal to the weight of the source color in the source color distribution. The set of constraints can also include the sum of the flows with respect to the colors of the target color palette and the colors of the source color palette being equal to the total flow constraint.

In one example of the embodiment discussed above, $C_T$ and $C_I$ are weighted color distributions of target art and source graphic, respectively. In this example, $C_T$ has m colors with $C_T=(C_{T1};w_{C_{T1}}),(C_{T2};w_{C_{T2}}) \ldots (C_{Tm}; w_{C_{Tm}})$, where $C_{Ti}$ is the ith color and $w_{C_{Ti}}$ is the weight of the ith color. Similarly, $C_I$ has n colors with $C_I=(C_{I1}; w_{C_{I1}}), (C_{I2}; w_{C_{I2}}) \ldots (C_{In};w_{C_{In}})$, where $C_{Ij}$ is the jth color and $w_{C_{Ij}}$ is the weight of the jth color. (In some embodiments, m=n, but this example is applicable for any values of m, n>0.) The ground distance between $C_T$ and $C_I$ is $D=[d_{C_{Ti},C_{Ij}}]$. The color-update engine 106 computes a palette flow $F=[f_{i,j}]$, where $f_{i,j}$ is a flow between target color $C_{Ti}$ and source color $C_{Ij}$.

Continuing with this example, the color-update engine 106 computes a palette flow that minimizes a cost. For instance, the color-update engine 106 accesses an objective function:

$$\sum_{i=1}^{m}\sum_{j=1}^{n} f_{C_{Ti},C_{Ij}} d_{C_{Ti},C_{Ij}}$$

The color-update engine 106 computes flows (i.e., $f_{C_{Ti},C_{Ij}}$ for i=1 ... m and j=1 ... n) that minimize this objective function subject to a set of constraints. One of these constraints is represented by the following formula:

$$f_{C_{Ti},C_{Ij}} \geq 0, 1 \leq i \leq m, 1 \leq j \leq n$$

This constraint requires each flow from a target color to a source color to have a value greater than 0. Another one of these constraints is represented by the following formula:

$$\sum_{j=1}^{n} f_{C_{Ti},C_{Ij}} \leq w_{C_{Ti}}, 1 \leq i \leq m$$

This constraint requires that a sum of flows for a given target color i to be less than a weight for that target color i. Another one of these constraints is represented by the following formula:

$$\sum_{i=1}^{m} f_{C_{Ti},C_{Ij}} \leq w_{C_{Ij}}, 1 \leq j \leq n$$

This constraint requires that a sum of flows for a given source color j to be less than a weight for that source color j. Another one of these constraints is represented by the following formula:

$$\sum_{i=1}^{m}\sum_{j=1}^{n} f_{C_{Ti},C_{Ij}} = \min\left\{\sum_{i=1}^{m} w_{C_{Ti}}, \sum_{j=1}^{n} w_{C_{Ij}}\right\}$$

This total flow constraint requires that the sum of all of the flows must be equal to a minimum of a total target weight and a total source weight, where a total target weight $\Sigma_{i=1}^{m} w_{C_{Ti}}$ is a sum of the weights of the target colors in the target color palette and a total source weight $\Sigma_{j=1}^{n} w_{C_{Ij}}$ is a sum of the weights of the source colors in the source color palette.

In this example, a palette flow F is computed by solving this linear optimization problem. The earth-mover distance is defined as the work normalized by the total flow, as represented in the following formula:

$$EMD(P, Q) = \frac{\sum_{i=1}^{m}\sum_{j=1}^{n} f_{C_{Ti},C_{Ij}} d_{C_{Ti},C_{Ij}}}{\sum_{i=1}^{m}\sum_{j=1}^{n} f_{C_{Ti},C_{Ij}}}$$

In some embodiments, solving the linear optimization problem involves computing one or more sets of flows between the colors of the source color palette and one or more target color of the target color palette that minimize the earth-mover distance. For instance, for a given target color i, block 504 involves finding a set of flows between each of source color j in the source color palette that causes the earth-mover distance to be minimized. The set of flows allows for recoloring objects of the target graphic using color information from the source color palette, as described further below.

An illustrative example of a palette flow is provided in Table 1 below. In this simplified example, a source color palette has three source palette colors and a target color palette has three target palette colors. In this example, the palette flow is a data structure in which a record for a given color from a target palette identifies the set flows between that target color and the various source color palettes. For instance, a record for a first target color (identified as "target palette color 1" in the example of Table 1) would include data (e.g., columns or other fields) identifying a flow of $f_{1,1}$ between the first target color and the first source color, a flow of $f_{1,2}$ between the first target color and the second source color, and a flow of $f_{1,3}$ between the first target color and the third source color.

TABLE 1

Palette flow example

|  | Source Palette Color 1 | Source Palette Color 2 | Source Palette Color 3 |
|---|---|---|---|
| Target Palette Color 1 | $f_{1,1}$ | $f_{1,2}$ | $f_{1,3}$ |
| Target Palette Color 2 | $f_{1,1}$ | $f_{2,2}$ | $f_{2,3}$ |
| Target Palette Color 3 | $f_{3,1}$ | $f_{3,2}$ | $f_{3,3}$ |

In some embodiments, after obtaining the palette flow using earth-mover distance, the color-update engine 106 attempts to harmonize the colors. This can be performed using the luminance value or without the luminance value. An example of such harmonization can be found in Chang et al., "Palette-based Photo Recoloring," *ACM Transactions on Graphics*, 2015.

At block 506, the process 500 involves mapping, via the palette flow, target color information included in the target graphic source color information to the source color palette. For instance, the color-update engine 106 accesses color information for pixels of a target graphic that is a raster graphic, color parameters of a target graphic that is a vector graphic, or some combination thereof. The color-update engine 106 determines that a given portion of the target graphic (e.g., one or more pixels, a path object, etc.) has a particular color. The color-update engine 106 identifies, for the particular color, the corresponding color within the target color palette. In examples involving paths with constant colors, the particular color and the corresponding color within the target color palette could be the same. In examples involving a palette color determined from a clustering process, the color-update engine 106 identifies which color within the target color palette was determined from the cluster to which the particular color was assigned.

In examples involving the minimization of an earth-mover distance, block 506 involves mapping, via the palette flow, the target color from the target graphic to a modified target color that is a weighted combination of source colors from the source color palette. The weights in this weighted combination are the set of flows between the colors of the source color palette and the target color that cause the earth-mover distance to be minimized at block 504. An example of a formula representing this operation is provided below.

$$C'_{Ti} = \frac{\sum_{j=1}^{n} f_{C_{Ti},C_{Ij}} \times C_{Ij}}{\sum_{j=1}^{n} f_{C_{Ti},C_{Ij}}}$$

In this formula, a modified color $C'_{Ti}$ is computed from a set of flows $f_{C_{Ti},C_{Ij}}$ between target color $C_{Ti}$ and a source color $C_{Ij}$. The summation of multiplying these flows by the source color $C_{Ij}$ is normalized with respect to the summation of these flows. For instance, in the example above, the term $\Sigma_{j=1}^{n} f_{C_{Ti},C_{Ij}} \times C_{Ij}$ is divided by the term $\Sigma_{j=1}^{n} f_{C_{Ti},C_{Ij}}$.

At block 508, the process 500 involves performing a modification to the target graphic by changing the target color information to using the source color information. For instance, the graphics editor 102 modifies a digital file containing the target graphic to include updated color information. Examples of this modification include modifying color information for pixels of a target graphic that is a raster graphic, modifying the values of one or more color parameters of a target graphic that is a vector graphic, or some combination thereof.

In some embodiments, performing a modification to the target graphic involves modifying a copy of the target graphic used in a preview function of the graphics editor 102. For instance, a recoloring tool 104 or other tool of the graphics editor 102 can retrieve a set of source graphics that includes the source graphic. The recoloring tool 104 can display the target graphic and the set of source graphics in a suitable interface, such interfaces described with respect to the examples of FIGS. 2-4. The recoloring tool 104 can receive user input that is directed to the source graphic as displayed within the interface of the recoloring tool 104, where the user input indicates a selection of the source graphic. The recoloring tool 104 responds to this selection input by generating a preview of a recolored target graphic. The preview recolored target graphic is generated by modifying a copy of the target graphic to include the change from target color information to source color information described above with respect to block 508.

In additional or alternative embodiments, performing a modification to the target graphic involves creating a modified target graphic that is outputted by the graphics editor 102. For instance, a recoloring tool 104 can receive a recoloring command. The recoloring tool 104 can respond to the recoloring command by applying color information from the source color palette to the target graphic. Applying color information from the source color palette to the target graphic can include changing target color information in the target graphic to include source color information, as described above with respect to block 508. The graphics editor 102 outputs the recolored target graphic in a suitable format (e.g., as a raster graphic or vector graphic). Examples of outputting the recolored target graphic include transmitting the recolored target graphic to one or more target devices, saving the recolored target graphic to a non-transitory computer-readable medium, or some combination thereof.

Example of a Process for Extracting Color Palettes

Figure 6:
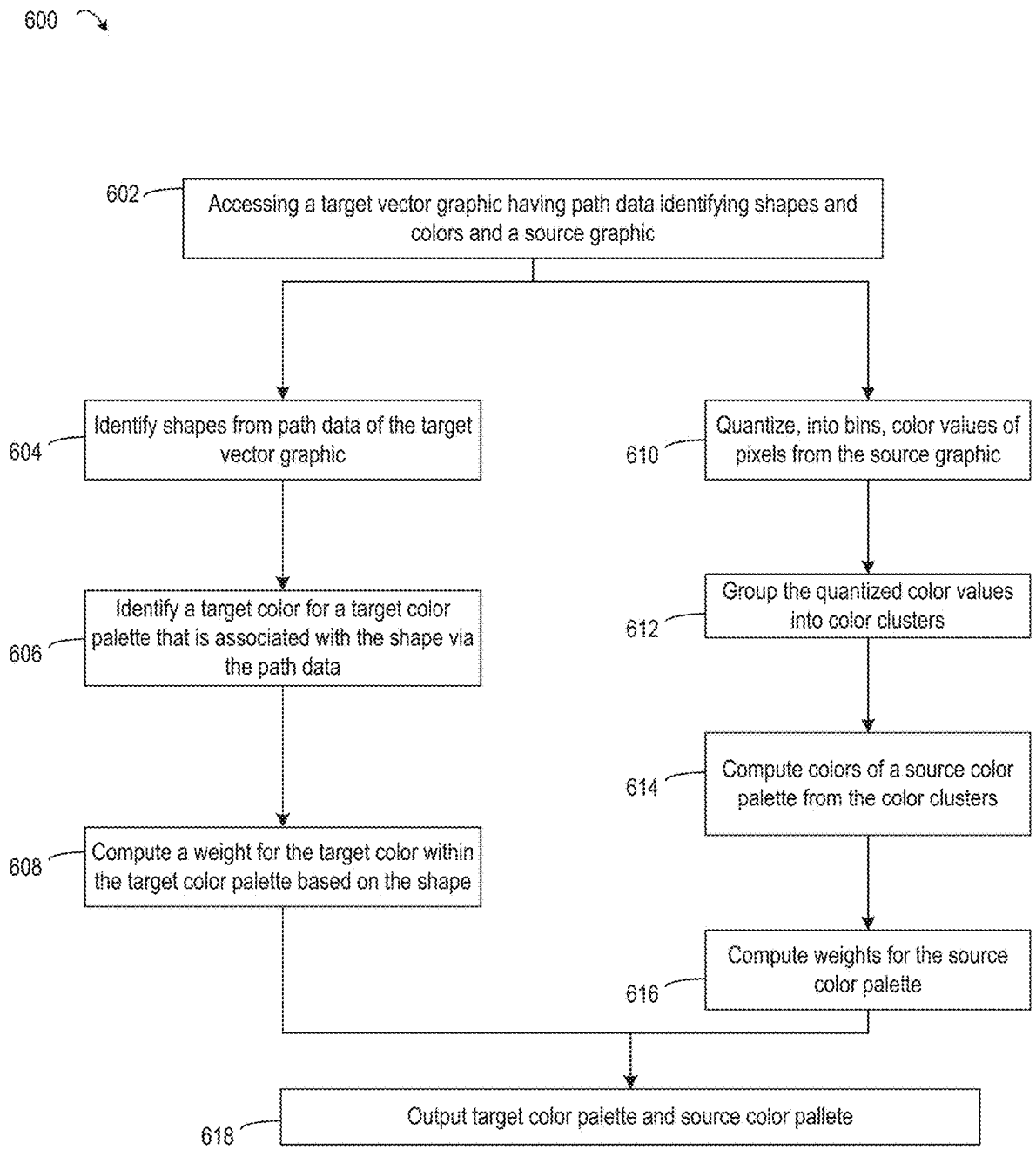
FIG. 6 depicts an example of a process for extracting color palettes from vector graphics using the computing environment of FIG. 1, according to certain embodiments of the present disclosure.

FIG. 6 depicts an example of a process 600 for extracting color palettes from vector graphics. One or more operations described with respect to FIG. 6, as well as one or more associated examples from FIG. 7, can be used to implement a step for extracting a target color palette from a target vector graphic, a step for extracting a source color palette from a source vector graphic, or both. In some embodiments, one or more computing devices implement operations depicted in FIG. 6 by executing suitable program code (e.g., the palette-extraction engine 108 or another engine of the graphics editor 102). For illustrative purposes, the process 600 is described with reference to certain examples depicted in the figures. Other implementations, however, are possible.

At block 602, the process 600 involves accessing (i) a target vector graphic having path data identifying shapes and colors and (ii) a source graphic. For instance, the palette-extraction engine 108 (or another engine of the graphics editor 102) performs one or more operations for accessing source or target graphics, such as the operations described herein with respect to block 202 of the process 200.

The palette-extraction engine 108 also performs one or more palette-extraction processes that extract a target color palette, a source color palette, or both. In some embodiments, a palette-extraction process for a target color palette includes operations from blocks 604-608. At block 604, the process 600 involves determining a shape from path data of the target vector graphic. For instance, the palette-extraction engine 108 can access one or more path objects from a target vector graphic. The palette-extraction engine 108 can obtain shape data from a path object. Examples of this shape data include a shape type (e.g., circle, rectangle, etc.), key points of the shape (e.g., a center of a circle, vertices of a rectangle), information about line or curve lengths (e.g., a circle radius), etc. The palette-extraction engine 108 can identify various shapes within a vector graphic based on the accessed shape data.

At block 606, the process 600 involves identifying a target color for a target color palette that is associated with the shape via the path data. For instance, the palette-extraction engine 108 can access one or more path objects from a target vector graphic. The palette-extraction engine 108 can reference various color parameters (e.g., stroke color, fill color, etc.) to identify or derive color information for the shape as rendered. In one example, the palette-extraction engine 108 can identify the color of a shape having a solid color by referencing a fill color. In another example, the palette-extraction engine 108 can derive one or more colors of a shape having a shading construct by referencing various parameters of the shading construct (e.g., stop colors) and computing the resulting color information that would be displayed in the rendered vector graphic.

At block 608, the process 600 involves computing a weight for the target color of block 606 based on the shape. For instance, the graphics editor 102 can determine, from the path data and the shape data, how much of a vector graphic, as rendered, would be occupied by one or more shapes with a given color. An increase in how much of a vector graphic, as rendered, is occupied by one or more shapes with a particular color can correspond to an increased weight for that particular color. A decrease in how much of a vector graphic, as rendered, is occupied by one or more shapes with a particular color can correspond to a decreased weight for that particular color.

In one example, blocks 604-608 are applied to vector graphics having paths with constant colors. In this example, the palette-extraction engine 108 implements block 604 by planarizing a target vector graphic. For instance, the target vector graphic could include a first path (i.e., a first shape) in a first layer and a second path (i.e., a second shape) in a second layer having a portion that is positioned below the first path, such that a portion of the second path is obscured. Planarizing such a target vector graphic can involve creating a modified version of the target vector graphic, where the modified version of the target vector graphic includes, in a single layer, the first path and a modified version of the second path in which the obscured portion of the second path is removed. Planarizing the target vector graphic can remove, from consideration by the palette-extraction process, color data for obscured regions of a multilayer graphic, thereby resulting in a more accurate identification of colors and associated weights for a color palette. For instance, if portion of a particular path is not visible to a viewer when a target vector graphic is rendered, then a color that only occurs in that obscured portion should be excluded from the resulting target color palette and/or the obscured portion of the path should not be considered when determining the density (and associated weight) of that color.

Continuing with this example of vector graphics having paths with constant colors, the palette-extraction engine 108 implements block 604 by identifying one or more planar faces from the target vector graphic that has been planarized. The palette-extraction engine 108 can implement block 606 by traversing each planar face and identifying each unique color that is encountered via the traversal. As a simplified example, a target vector graphic could be comprised of three non-overlapping paths, i.e., three planar faces. Two of the planar faces could have a "red" color and one of the planar faces could have a "blue" color. At block 606, the palette-extraction engine 108 traverses the three paths, identifies the two unique colors among the paths, and adds these two unique colors (red and blue) to a target color palette.

Continuing with this example of vector graphics having paths with constant colors, the palette-extraction engine 108 can implement block 608 by computing a value indicating how much of the planarized target vector graphic is occupied by a given color. To do so, the palette-extraction engine 108 computes a total number of pixels occupied by each path. For instance, palette-extraction engine 108 could create a temporary, rasterized copy of the target vector graphic from block 606 (e.g., in a buffer of a graphics processing unit). The palette-extraction engine 108 also determines the total pixel coverage of the rasterized target vector graphic (i.e., the total number of pixels used to render the rasterized target vector graphic). The palette-extraction engine 108 also determines, for each unique color identified at block 606, a respective number of pixels of the rasterized target vector graphic having the unique color. The palette-extraction engine 108 computes a respective weight for the unique color by normalizing the respective number of pixels having the unique color with respect to the total pixel coverage of the rasterized target vector graphic. For instance, the normalization could involve dividing the number of pixels for the unique color by the total number of pixels used to render the rasterized target vector graphic.

In some cases, generating a rasterized graphic in a buffer of a graphics processing unit allows the palette extraction process to be performed more efficiently. As a result, the recoloring process can be completed with reduced processing time (e.g., within milliseconds), thereby providing a more responsive and intuitive workflow (e.g., in the process 500).

In another example, blocks 604-608 are applied to vector graphics having paths with shading constructs (e.g., linear or radial gradients, gradient meshes, freeform gradients, etc.). In this example, the palette-extraction engine 108 can implement block 604 by identifying one or more paths from the target vector graphic that include a shading construct, and can implement block 606 using discrete colors specified in the shading construct. In one example, these discrete colors are the stop colors in a linear or radial gradient. To implement block 606, the palette-extraction engine 108 can rasterize each path in the target vector graphic having a shading construct. The palette-extraction engine 108 performs a k-means clustering process on each rasterized path of the target vector graphic.

For instance, the k-means clustering process is used to cluster points defined by vectors within a color space, where a given vector includes the color values (e.g., a luminance value, red/green value, and a blue/yellow value) defining a given color in the color space (e.g., the L*a*b* color space). The palette-extraction engine 108 computes, for each pixel in a given path, a set of L2 distances. Each L2 distance is computed between the pixel's color (i.e., the vector of color values for a pixel in a rasterized path) and a respective one of the cluster centers (i.e., the vector of color values for one of the discrete colors of the shading construct). The palette-extraction engine 108 classifies a given pixel as belonging to a certain cluster if the L2 distance for the pixel's color and the cluster center is less than the L2 distance for the pixel's color and any other cluster center.

In the k-means clustering process, the palette-extraction engine 108 initializes the cluster centers using the discrete colors of the shading construct. In the example above, different shading constructs can result in different initializations in the k-means clustering process. If the shading construct is a linear or radial gradient, the palette-extraction engine 108 initializes bins by using stop colors of the gradient as the initial cluster centers. If the shading construct is a gradient mesh, the palette-extraction engine 108 initializes bins by using, as the initial cluster centers, the discrete colors that are applied to vertices of the paths. If the shading construct is a freeform gradient, the palette-extraction engine 108 initializes bins by enumerating colors from color curves and points, where an effective color at each pixel in a freeform gradient is a weighted combination of these enumerated colors. Therefore, the palette-extraction engine 108 uses these weights, along with enumerated colors, to determine weighted color distributions for each path having a freeform gradient.

Continuing with this example involving shading constructs, the palette-extraction engine 108 can implement block 608 using the clusters resulting from the k-means clustering process. For instance, a color value at a cluster center can be used as one of the palette colors in a target color palette. The palette-extraction engine 108 can compute a weight for this palette color by identifying the number of pixels that have been classified as being in the cluster and normalizing the number of pixels using the total pixel coverage of the path.

The palette-extraction engine 108 can also perform a palette-extraction process for a source color palette. An example of a palette-extraction process for a source color palette can include operations from blocks 610-616. At block 610, the process 600 involves quantizing, into bins, color values of pixels from the source graphic. For instance, the palette-extraction engine 108 can access a source graphic that is a raster graphic or generate a rasterized version of a source graphic that is a vector graphic. The palette-extraction engine 108 can identify color information for each pixel in the raster graphic. The palette-extraction engine 108 can quantize the pixels into bins based on the color information. This quantization, in some cases, allows for improved processing speeds (e.g., within milliseconds), thereby providing a more responsive and intuitive workflow (e.g., in the process 500).

At block 612, the process 600 involves grouping the quantized color values into color clusters. For instance, the palette-extraction engine 108 can perform k-means clustering on the binned color values from block 610. In some embodiments, the palette-extraction engine 108 selects a value of k (i.e., the number of centroids in the k-means clustering) at block 610 that is equal to the number of discrete colors identified for a target graphic. In a simplified example, if the target graphic only includes a path having a gradient mesh defined by three discrete colors that are applied to vertices, the palette-extraction engine 108 sets k=3. In another example, if a target color palette having six discrete colors is identified in blocks 604-608, the palette-extraction engine 108 sets k=6.

At block 614, the process 600 involves computing the colors of the source color palette from the color clusters, where each color from the source color palette corresponds to a respective color cluster. For instance, the palette-extraction engine 108 selects a color at a cluster center (e.g., the L*a*b* values from the vector identifying the location of the cluster center) as one of the palette colors in the source color palette.

At block 616, the process 600 involves computing weights for the source color palette based on the respective numbers of pixels in the color clusters. For instance, the palette-extraction engine 108 identifies, for a given palette color, the cluster from which the palette color was determined. The palette-extraction engine 108 identifies the number of pixels assigned to the cluster. The palette-extraction engine 108 determines the total pixel coverage of the source graphic (i.e., the total number of pixels used to render the raster graphic accessed as block 610). The palette-extraction engine 108 computes a weight for the given palette color by, for example, normalizing the respective number of pixels associated with the palette color with respect to the total pixel coverage of the source graphic. For instance, the normalization could involve dividing the number of pixels associated with the palette color by the total number of pixels used to render the source graphic, where the number of pixels associated with the palette color is the number of pixels assigned to the cluster from which the palette color was determined.

At block 618, the process 600 involves outputting a target color palette, a source color palette, or both. In embodiments involving the process 600, one or more of the outputted color palettes are used in a flow-computation process (e.g., the process 500) to compute a palette flow that maps colors of the target color palette to colors of the source color palette and to use the palette flow to modify color information of the target vector graphic.

While FIG. 6 depicts a process for extracting color palettes from vector graphics, other implementations are possible. In some embodiments, the palette-extraction engine 108 can extract a palette from a raster image. To do so, pixels of the raster graphic are quantized into bins. The palette-extraction engine 108 applies k-means clustering to the bins and thereby identifies palette colors from the target graphic. In particular, the palette-extraction engine 108 uses, as the target palette colors, the centers of clusters obtained from the convergence of the k-means clustering. The number of pixels assigned to a given cluster is used to compute a weight for a target palette color (i.e., the color defined by the point at the cluster center). For instance, a number of pixels assigned to a cluster is normalized by dividing the number of pixels by the total number of pixels in the raster target graphic.

In some embodiments, a palette-extraction process for a vector graphic, a raster graphic, or both can involve converting color information represented using a first color space into color information represented using a second color space. For instance, the colors of the target graphic accessed at block 602, the source graphic accessed at block 602, or both could be originally represented in an RGB color space. In a palette-extraction process (e.g., blocks 604-608, blocks 610-616, or the raster-graphic palette extraction), the palette-extraction engine 108 converts these colors from the RGB color space to an L*a*b* color space. In some embodiments, using an L*a*b* color space can improve the performance of a recoloring process. In one example, using an L*a*b* color space allows for distinguishing between colors in a manner similar to how a human eye distinguishes between colors. In another example, a Euclidean distance between colors in an L*a*b* color space can provide a more useful measure of similarity between colors as compared to a Euclidean distance between colors in an RGB color space. In another example, by using an L*a*b* color space, the graphics editor 102 has access to the L* channel, i.e., a luminance parameter controlling the darkness of an image. The graphics editor 102 can be configured, in some cases, to ignore the L* channel when performing a palette-extraction process (e.g., by applying a clustering process that only uses only two-dimensions representing the a* and b* channels from the L*a*b* color space). Ignoring the L* channel can allow color information of a source graphic to be transferred to a target graphic without modifying the brightness or darkness of the target graphic in an undesirable manner. For instance, if a source graphic depicts a sunny day and a target graphic depicts a night scene, ignoring the L* channel can allow the target graphic to be recolored using the source color palette of the source graphic without changing the "sunny" appearance of the target graphic.

Figure 7:
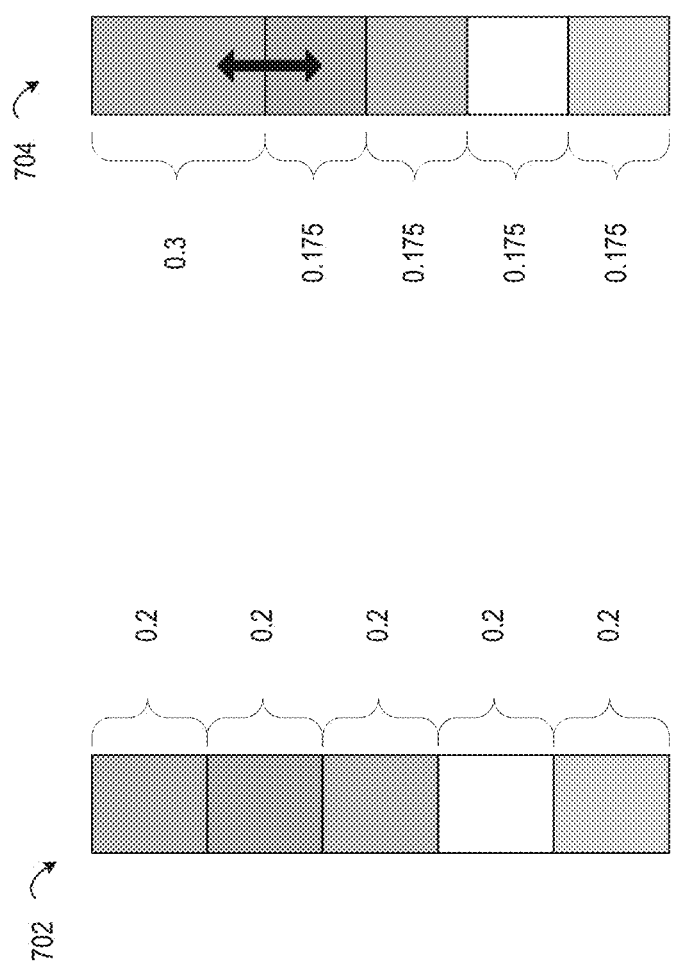
FIG. 7 depicts an example of an interface element for modifying weights of colors in a color palette used in the computing environment of FIG. 1, according to certain embodiments of the present disclosure.

In some embodiments, one or more weights used in the computation of a palette flow are modified via one or more user inputs. For instance, the graphics editor 102 can present, in a recoloring tool 104, a weight-modification interface element. FIG. 7 depicts an example of a weight-modification interface element 702 prior to a user modification and a corresponding weight-modification interface element 704 after a user modification. In this example, the weight-modification interface element 702 displays visual indicators (i.e., colored rectangles) of five different colors (i.e., pink, green, orange, white, and blue) in a color palette. The heights of the visual indicators indicate weights of the different colors. In this simplified example, the weight-modification interface element 702 indicates a weight of 0.2 for each color. The weight-modification interface element 702 can receive user input (e.g., via a slider) that indicates a user-specified weight for one or more colors in the source color palette. The graphics editor 102 can respond to receiving this user input by modifying one or more weights of one or more colors in the source color palette. The graphics editor 102 can also indicate the modified weight by updating the appearance of the weight-modification interface element 702 to obtain weight-modification interface element 704. In this example, the weight-modification interface element 704 displays modified visual indicators (i.e., colored rectangles) of five different colors (i.e., pink, green, orange, white, and blue) in a color palette. The modified heights of the visual indicators indicate weights of the different colors. In this simplified example, the weight-modification interface element 704 indicates a weight of 0.3 for the pink color, which was modified from the weight of 0.2 indicated by the weight-modification interface element 704, and a weight of 0.175 for each other color in the color palette. The graphics editor 102 uses these modified weights to compute a palette flow in the manner described above.

The example from FIG. 7 shows a variably sizable source color palette derived from a source graphic. The weight-modification interface element, which can receive a sliding or dragging input, can provide an intuitive mechanism to change the relative distribution of colors in the source color palette, such as by using a slider for increasing or decreasing the relative density of any particular color. For instance, as shown in FIG. 7, if the palette contains a pink color and the user wants to have the target graphic recolored with a higher proportion of pink, then the user can increase the proportion using the provided slider control.

In some embodiments, the graphics editor 102 updates a preview of a recolored target graphic to display how changes in the weights of the source color palette will impact the recolored target graphic. For instance, a preview of a recolored target graphic could initially depict a recolored target graphic that is generated using an initial palette flow, i.e., a palette flow computed using weights in the source color palette that are identified in a palette-extraction process. If the graphics editor 102 receives a user input to a weight-modification interface element, the graphics editor 102 changes the preview from the recolored target graphic as initially depicted to the recolored target graphic generated with the one or more user-modified weights for the source color palette.

Example of a Computing System for Implementing Certain Embodiments

Figure 8:
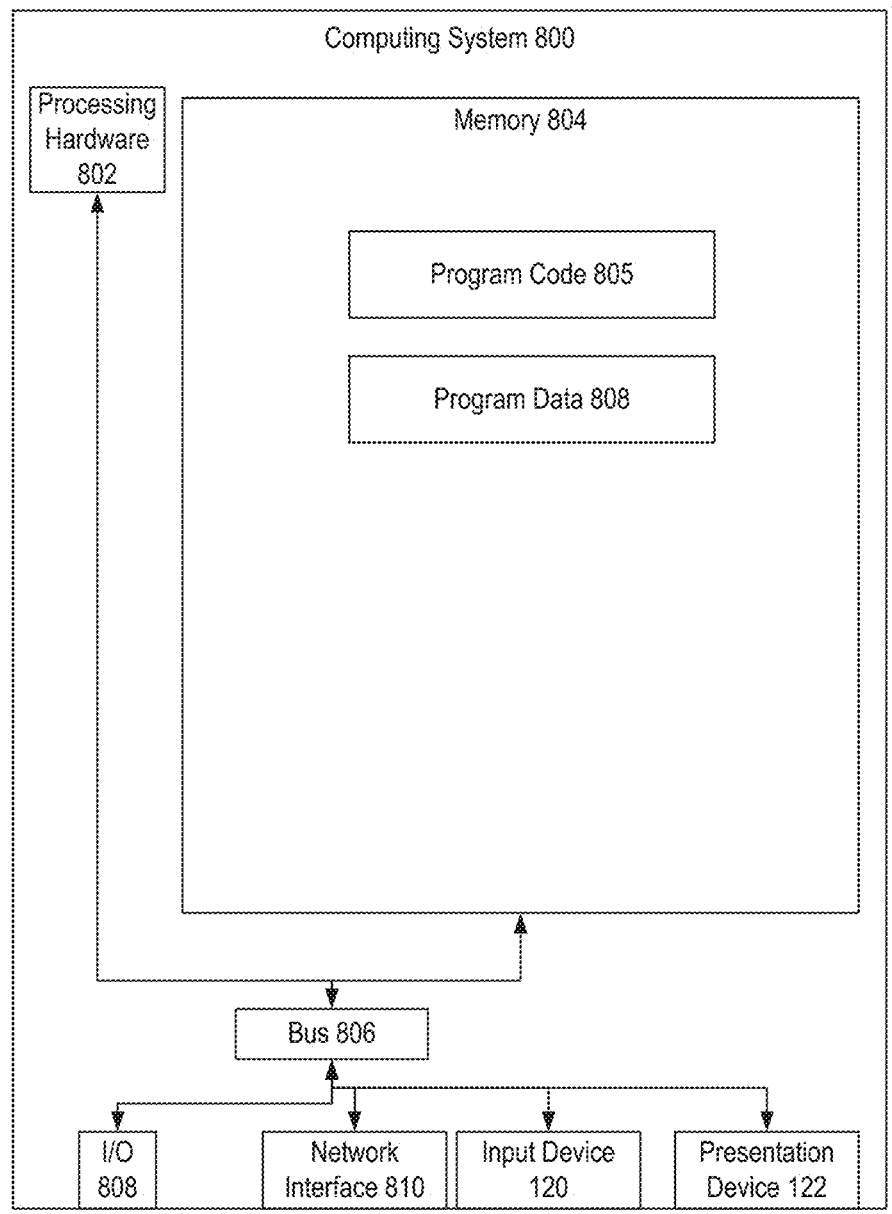
FIG. 8 depicts an example of a computing system that can implement the computing environment of FIG. 1, according to certain embodiments of the present disclosure.

Any suitable computing system or group of computing systems can be used for performing the operations described herein. For example, FIG. 8 depicts an example of a computing system 800. In some aspects, the computing system 800 includes a processing device 802 that executes program code 805 (e.g., the graphics editor 102), a memory device 804 that stores various program data 807 computed or used by operations in the program code 805 (e.g., source graphics, target graphics, color palettes, etc.), one or more input devices 812, and a presentation device 814 that displays graphical content generated by executing the program code 805. For illustrative purposes, FIG. 8 depicts a single computing system on which the program code 805 is executed, the program data 807 is stored, and the input devices 812 and presentation device 814 are present. But various applications, datasets, and devices described can be stored or included across different computing systems having devices similar to the devices depicted in FIG. 8.

The depicted example of a computing system 800 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code 805. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 805 may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as an input device 812, a presentation device 814, or other input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processing device 802 to perform one or more of the operations described herein. The program code includes, for example, the recoloring tool 104, the color-update engine 106, the palette-extraction engine 108, or other suitable applications that perform one or more operations described herein. The program code may be resident in the memory device 804 or any suitable computer-readable medium and may be executed by the processing device 802 or any other suitable processor. The program code 805 uses or generates program data 807. Examples of the program data 807 include one or more of the graphics, palettes, mappings, configuration settings, etc. described herein with respect to FIGS. 1-7.

In some aspects, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices via a data network using the network interface device 810.

An input device 812 can include any device or group of devices suitable for receiving visual, auditory, or other suitable input that controls or affects the operations of the processing device 802. Non-limiting examples of the input device 812 include a recording device, a touchscreen, a mouse, a keyboard, a microphone, a video camera, a separate mobile computing device, etc. A presentation device 814 can include any device or group of devices suitable for providing visual, auditory, or other suitable sensory output. Non-limiting examples of the presentation device 814 include a touchscreen, a monitor, a separate mobile computing device, etc.

Although FIG. 8 depicts the input device 812 and the presentation device 814 as being local to the computing device that executes the program code 805, other implementations are possible. For instance, in some aspects, one or more of the input device 812 and the presentation device 814 can include a remote client-computing device that communicates with the computing system 800 via the network interface device 810 using one or more data networks described herein.

EXPERIMENTAL EXAMPLES

FIGS. 9-12 depict various experimental examples of graphics that are used by or generated with certain embodiments described herein.

Figure 9:
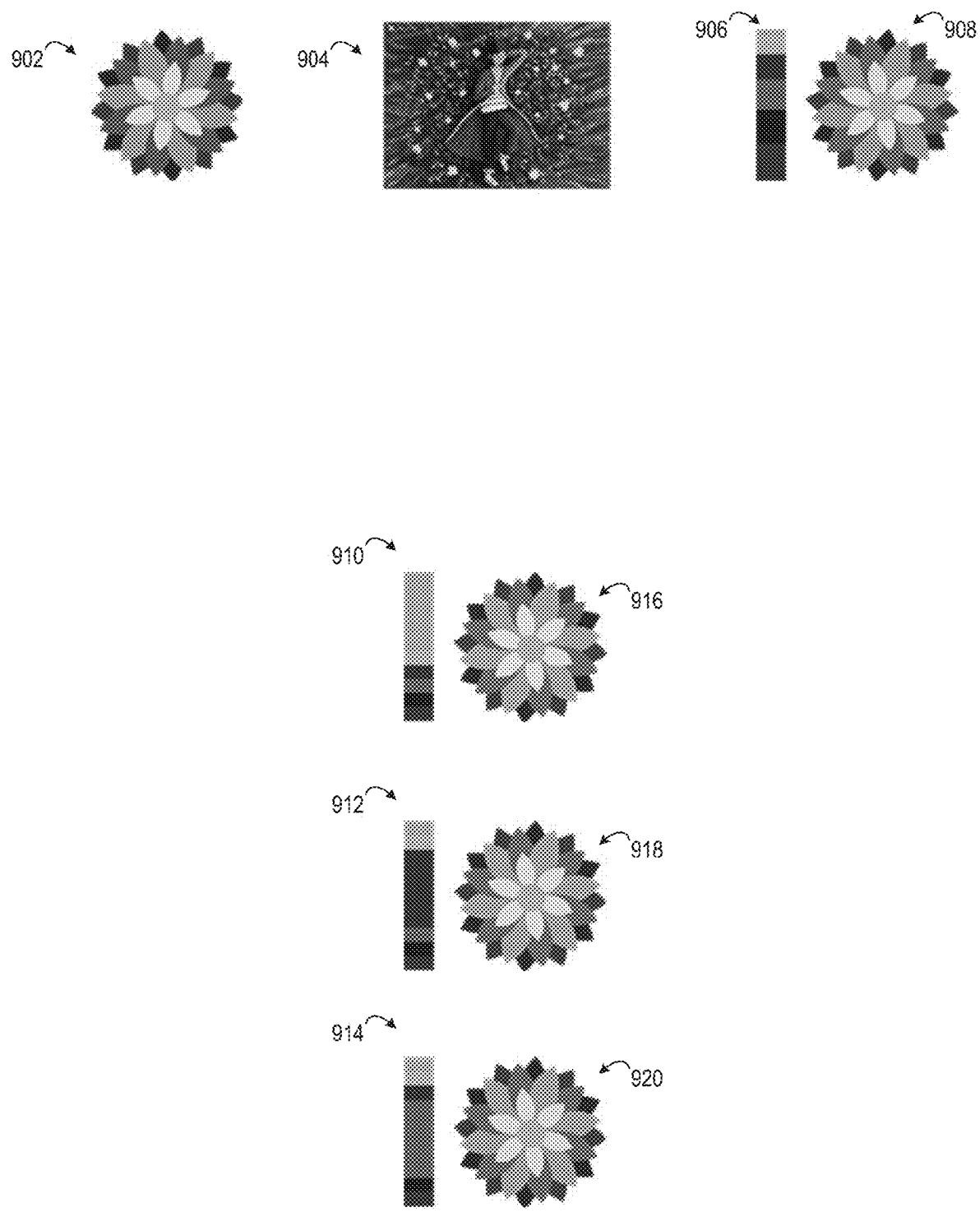
FIG. 9 depicts an example of a recoloring process using different user-specified variations in the weights from a source color palette, according to certain embodiments of the present disclosure.

FIG. 9 depicts an example of a recoloring process using different user-specified variations in the weights from a source color palette. In this example, a target graphic 902 is recolored, using a source graphic 904 having an extracted source color palette represented by palette view 906, to generate a recolored target graphic 908. Palette view 906 visually depicts colors in the extracted source color palette, with the heights of colored sections indicating respective weights of these palette colors. Variations of the recoloring are also depicted in FIG. 9. For instance, user inputs can cause the extracted source color palette represented by palette view 906 to be changed into modified source color palettes represented by modified palette views 910 (having an increased weight for the first palette color), 912 (having an increased weight for the third palette color), and 914 (having an increased weight for the fourth palette color). Performing a recoloring process with the modified source color palettes represented by modified palette views 910, 912, and 914 generates the target graphic 916, 918, and 920, respectively.

Figure 10:
FIG. 10 depicts an example of a recoloring process using different luminance control settings, according to certain embodiments of the present disclosure.
Figure 10:
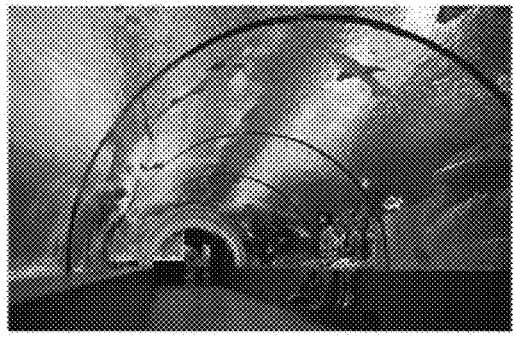
Figure 10:
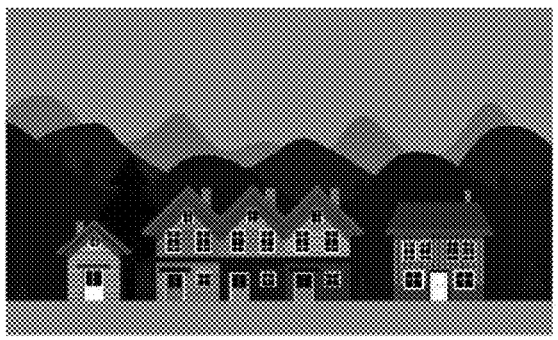
Figure 10:

FIG. 10 depicts an example of a recoloring process using different luminance control settings. In this example, a target graphic 1002 is recolored, using a source graphic 1004, to generate various recolored target graphics 1006 and 1008. The recolored target graphic 1006 is generated with a recoloring process that includes a transfer of luminance values. The recolored target graphic 1008 is generated with a recoloring process that excludes luminance values from a color transfer. Thus, the recolored target graphic 1008 has a similar brightness and/or contrast as compared to the target graphic 1002, while being recolored with colors that more closely resemble the blue and gray coloring in the source graphic 1004.

Figure 11:
FIG. 11 depicts an example of a recoloring process using different background control settings, according to certain embodiments of the present disclosure.
Figure 11:
Figure 11:
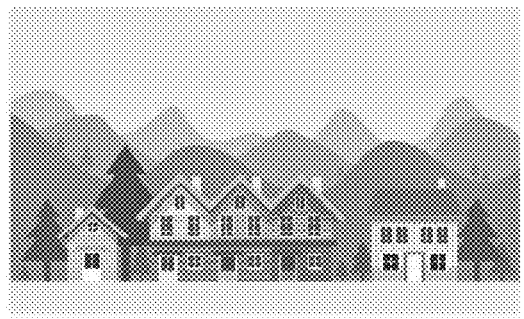
Figure 11:
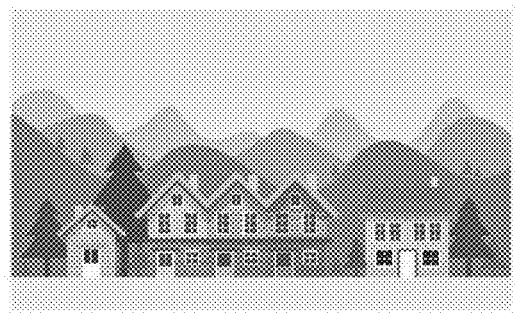

FIG. 11 depicts an example of a recoloring process using different background control settings. In this example, a target graphic 1102 is recolored, using a source graphic 1104, to generate various recolored target graphics 1106 and 1108. The recolored target graphic 1106 is generated with a recoloring process that includes a transfer of a background color. The recolored target graphic 1108 is generated with a recoloring process that excludes the background color from a color transfer and/or uses a lower weight for the background color in the color transfer. Thus, the recolored target graphic 1108 has a smaller amount of green coloring (i.e., the background color in the source graphic 1104) as compared to the recolored target graphic 1106.

Figure 12:
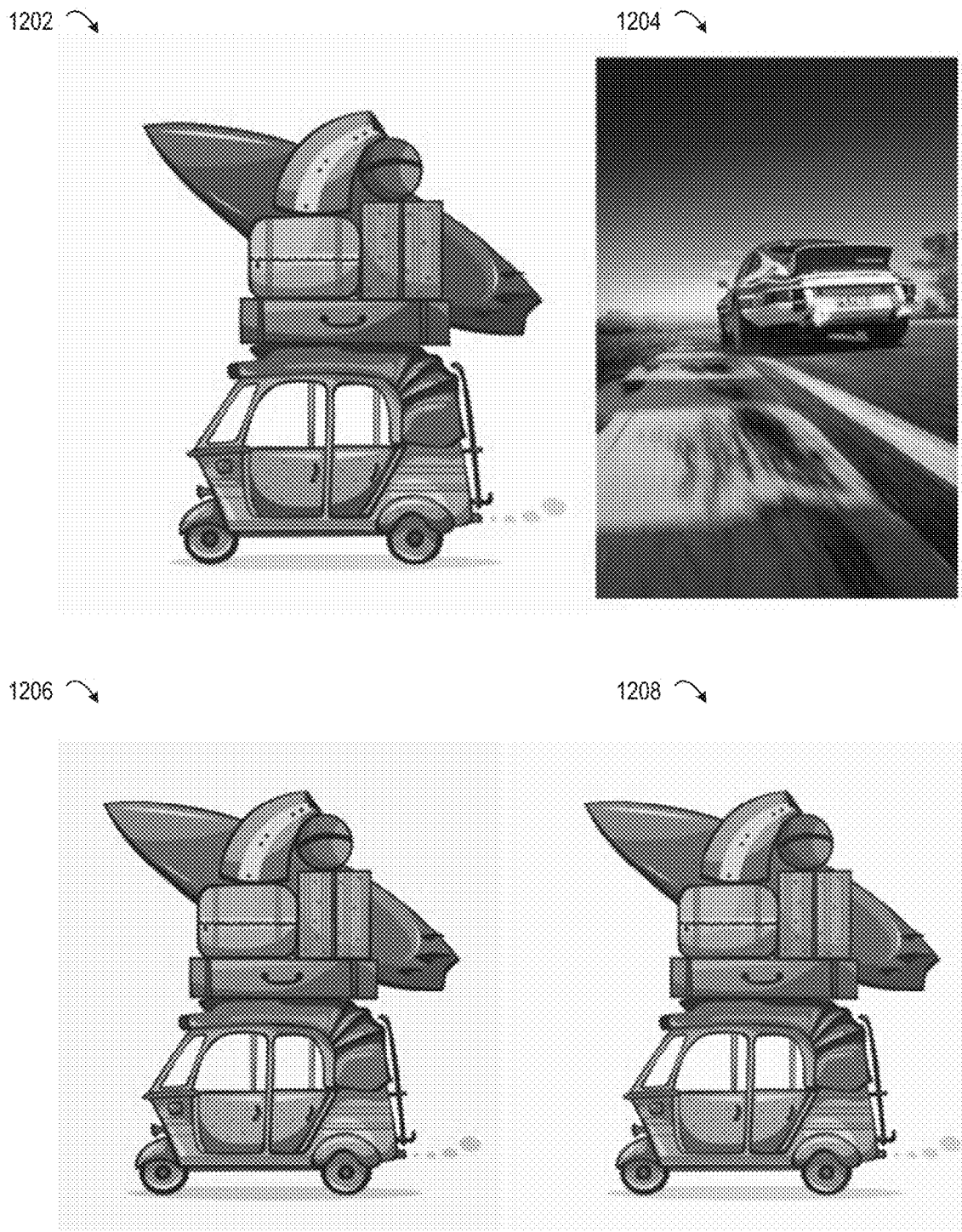
FIG. 12 depicts an example of an improved aesthetic quality that is achieved by performing a flow-based color transfer, according to certain embodiments of the present disclosure.

FIG. 12 depicts experimental results of using a color transfer based on an earth-mover distance metric. In this example, a target graphic 1202 is recolored, using a source graphic 1204, to generate various recolored target graphics 1206 and 1208. The recolored target graphic 1206 is generated with a recoloring process that does not utilize an earth-mover distance metric. The recolored target graphic 1208 is generated with a recoloring process that utilizes an earth-mover distance metric in accordance with certain embodiments described herein with respect to FIG. 5. When the recolored target graphics 1206 and 1208 are compared, highlights used in the target graphic 1202 lose consistency in the recolored target graphic 1206, whereas the local coherence of these highlights are preserved in the recolored target graphic 1208 that uses an earth-mover distance metric.

For instance, the target graphic 1202 includes a door object in which a teal color with different luminance values predominates. In the recolored target graphic 1208 that uses an earth-mover distance metric, the door object is changed to a different predominant color that likewise includes different luminance values. But in the recolored target graphic 1206 that does not use an earth-mover distance metric, the door object is changed to a set of multiple colors with different chroma values, rather than merely having a difference in luminance values. Similar behavior can be found when comparing the suitcase object in the various target graphics (particularly with respect to the body of the suitcase), comparing the surfboard object (particularly with respect to the fins) in the various target graphics, etc.

Figure 13:
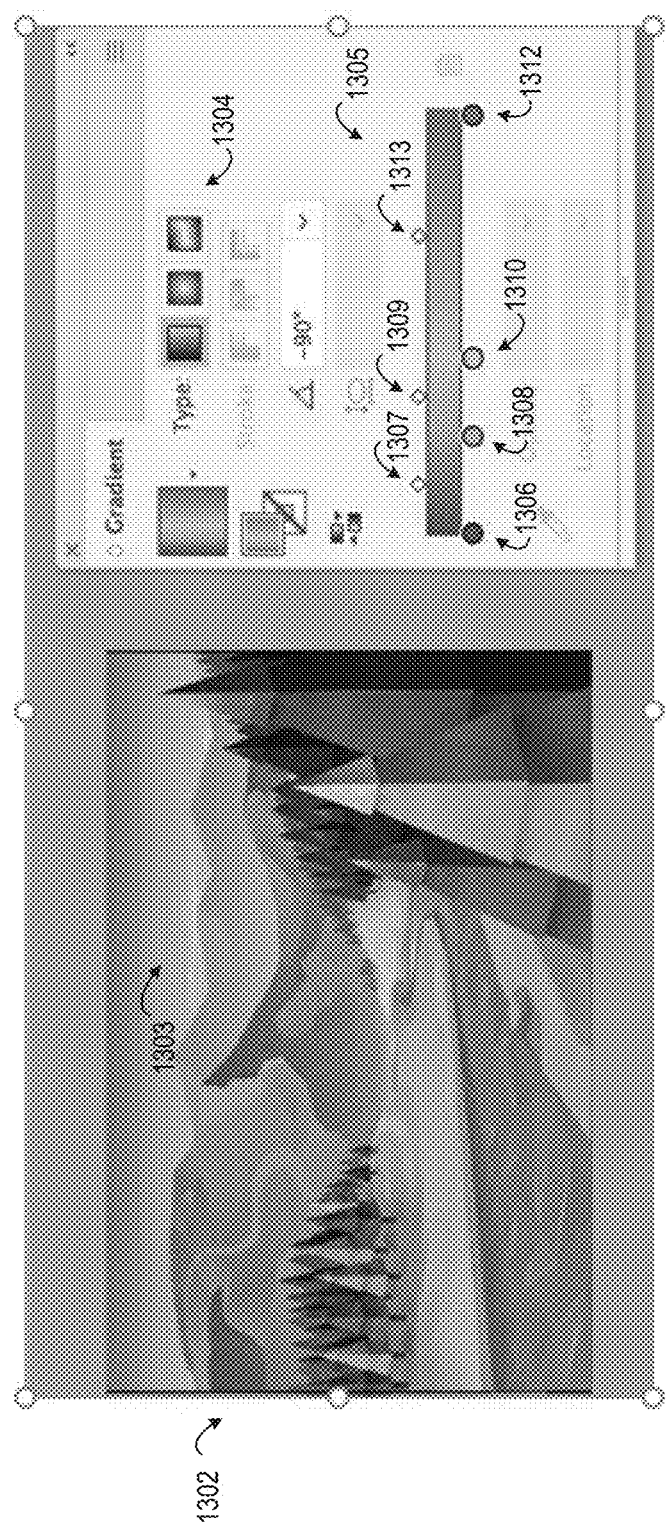
FIG. 13 depicts an example of an interface displaying a color palette that is extracted from a vector graphic having a shape with a gradient-based fill, according to certain embodiments of the present disclosure.

FIG. 13 depicts an example of an interface showing a color palette 1305 extracted from a vector graphic 1302 having a shape with a gradient-based fill. For instance, a horizontal region 1303 of the sky depicted in this example is colored using a gradient between a dark blue stop color (e.g., the palette color 1306) and a light blue stop color (e.g., the palette color 1308). In this example, the particular type of gradient is selected via control 1304. The gradient is defined using four stop colors. The color palette, in this example, is extracted from the landscape (i.e., the ground, rives, trees, mountains, and sky) depicted by the vector graphic 1302. The extracted color palette includes palette colors 1306, 1308, 1310, and 1312 that are positioned at or near the stop colors within a color space. In this example, weights of the palette colors are visually depicted using the diamond-shaped boundary markers 1307, 1309, and 1313. For instance, the area along the bar between the left edge and boundary marker 1307 indicates the distribution of palette color 1306 within the vector graphic 1302. The area along the bar between the boundary markers 1307 and 1309 indicates the distribution of palette color 1308 within the vector graphic 1302. The area along the bar between the boundary markers 1309 and 1313 indicates the distribution of palette color 1310 within the vector graphic 1302. For instance, the area along the bar between the right edge and boundary marker 1313 indicates the distribution of palette color 1308 within the vector graphic 1302.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
computing a palette flow that maps colors of a target color palette of a target graphic to colors of a source color palette for a source graphic, wherein the palette flow includes at least a set of flows between colors of the source color palette and a target color of the target color palette and wherein computing the palette flow comprises minimizing an earth-mover distance between a target color distribution of the target color palette and a source color distribution of the source color palette, wherein the earth-mover distance is minimized subject to at least one of:
(i) a sum of flows for each target color in the target color palette being less than or equal to a weight of the target color in the target color distribution; or
(ii) a sum of flows for each source color in the source color palette being less than or equal to a weight of the source color in the source color distribution;
mapping, via the palette flow, the target color from the target graphic to a modified target color that is a weighted combination of source colors from the source color palette, wherein weights of the weighted combination are a function of the set of flows between the colors of the source color palette and the target color; and
performing a modification to the target graphic by recoloring an object in the target color with the modified target color.

2. The method of claim 1, further comprising computing the weighted combination of source colors by dividing a summation of the target color multiplied by the set of flows by a summation of the set of flows.

3. The method of claim 1, wherein minimizing the earth-mover distance further comprises:
computing a total target weight that is a sum of weights of the colors in the target color palette;
computing a total source weight that is a sum of weights of the colors in the source color palette; and
selecting a total flow constraint that is a minimum of the total target weight and the total source weight.

4. The method of claim 1, further comprising:
retrieving, via a recoloring tool of a graphics manipulation application, a set of source graphics that includes the source graphic;
displaying, via the recoloring tool, the target graphic and the set of source graphics;
receiving a selection of the source graphic within the recoloring tool;
receiving, via the recoloring tool, a recoloring command; and
applying, responsive to the recoloring command, color information from the source color palette to the target graphic.

5. The method of claim 1, further comprising:
presenting, in a recoloring tool of a graphics manipulation application, a weight modification interface element for controlling one or more weights of the source color palette;
modifying, responsive to user input to the weight modification interface element, the one or more weights of the source color palette, wherein the palette flow is computed with the one or more weights of the source color palette as modified; and
generating, with the recoloring tool, a recolored target graphic that is generated from the modification to the target graphic.

6. The method of claim 1, wherein colors of the source graphic are represented as color vectors, wherein each color vector has a luminance vector element identifying a luminance value, the method further comprising:

presenting, in a recoloring tool of a graphics manipulation application, a luminance control interface element;
modifying, responsive to user input to the luminance control interface element, a luminance control setting to exclude the luminance value of one or more colors of the source graphic from a palette-extraction process; and
obtaining the source color palette from the source graphic by applying the palette-extraction process to the color vectors, wherein the applied palette extraction process excludes the luminance vector element of one or more of the color vectors.

7. The method of claim 1, further comprising calculating a weight of the target color in the target color distribution from a number of pixels used to display the target color by:
creating a rasterized graphic from the target graphic;
identifying a number of pixels in the rasterized graphic having the target color; and
determining the respective weight by normalizing the number of pixels with respect to a total number of pixels in the rasterized graphic.

8. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:
computing a palette flow that maps colors of a target color palette of a target graphic to colors of a source color palette for a source graphic, wherein the palette flow includes at least a set of flows between colors of the source color palette and a target color of the target color palette and wherein computing the palette flow comprises minimizing an earth-mover distance between a target color distribution of the target color palette and a source color distribution of the source color palette, wherein the earth-mover distance is minimized subject to at least one of:
(i) a sum of flows for each target color in the target color palette being less than or equal to a weight of the target color in the target color distribution; or
(ii) a sum of flows for each source color in the source color palette being less than or equal to a weight of the source color in the source color distribution;
mapping, via the palette flow, the target color from the target graphic to a modified target color that is a weighted combination of source colors from the source color palette, wherein weights of the weighted combination are a function of the set of flows between the colors of the source color palette and the target color; and
performing a modification to the target graphic by recoloring an object in the target color with the modified target color.

9. The system of claim 8, wherein the operations further comprise computing the weighted combination of source colors by dividing a summation of the target color multiplied by the set of flows by a summation of the set of flows.

10. The system of claim 8, wherein minimizing the earth-mover distance further comprises:
computing a total target weight that is a sum of weights of the colors in the target color palette;

computing a total source weight that is a sum of weights of the colors in the source color palette; and selecting a total flow constraint that is a minimum of the total target weight and the total source weight.

11. The system of claim 8, wherein the operations further comprise:

retrieving, via a recoloring tool of a graphics manipulation application, a set of source graphics that includes the source graphic;

displaying, via the recoloring tool, the target graphic and the set of source graphics;

receiving a selection of the source graphic within the recoloring tool;

receiving, via the recoloring tool, a recoloring command; and applying, responsive to the recoloring command, color information from the source color palette to the target graphic.

12. The system of claim 8, wherein the operations further comprise:

presenting, in a recoloring tool of a graphics manipulation application, a weight modification interface element for controlling one or more weights of the source color palette;

modifying, responsive to user input to the weight modification interface element, the one or more weights of the source color palette, wherein the palette flow is computed with the one or more weights of the source color palette as modified; and generating, with the recoloring tool, a recolored target graphic that is generated from the modification to the target graphic.

13. The system of claim 8, wherein colors of the source graphic are represented as color vectors, wherein each color vector has a luminance vector element identifying a luminance value, and wherein the operations further comprise:

presenting, in a recoloring tool of a graphics manipulation application, a luminance control interface element;

modifying, responsive to user input to the luminance control interface element, a luminance control setting to exclude the luminance value of one or more colors of the source graphic from a palette-extraction process; and obtaining the source color palette from the source graphic by applying the palette-extraction process to the color vectors, wherein the applied palette extraction process excludes the luminance vector element of one or more of the color vectors.

14. A non-transitory computer-readable storage medium storing computer-executable program instructions, wherein when executed by a processing device, the computer-executable program instructions cause the processing device to perform operations comprising:

computing a palette flow that maps colors of a target color palette of a target graphic to colors of a source color palette for a source graphic, wherein the palette flow includes at least a set of flows between colors of the source color palette and a target color of the target color palette and wherein computing the palette flow comprises minimizing an earth-mover distance between a target color distribution of the target color palette and a source color distribution of the source color palette, wherein the earth-mover distance is minimized subject to at least one of:

(i) a sum of flows for each target color in the target color palette being less than or equal to a weight of the target color in the target color distribution; or (ii) a sum of flows for each source color in the source color palette being less than or equal to a weight of the source color in the source color distribution;

mapping, via the palette flow, the target color from the target graphic to a modified target color that is a weighted combination of source colors from the source color palette, wherein weights of the weighted combination are a function of the set of flows between the colors of the source color palette and the target color; and performing a modification to the target graphic by recoloring an object in the target color with the modified target color.

15. The non-transitory computer-readable storage medium of claim 14, wherein the operations further comprise computing the weighted combination of source colors by dividing a summation of the target color multiplied by the set of flows by a summation of the set of flows.

16. The non-transitory computer-readable storage medium of claim 14, wherein minimizing the earth-mover distance further comprises:

computing a total target weight that is a sum of weights of the colors in the target color palette;

computing a total source weight that is a sum of weights of the colors in the source color palette; and selecting a total flow constraint that is a minimum of the total target weight and the total source weight.

17. The non-transitory computer-readable storage medium of claim 14, wherein the operations further comprise:

retrieving, via a recoloring tool of a graphics manipulation application, a set of source graphics that includes the source graphic;

displaying, via the recoloring tool, the target graphic and the set of source graphics;

receiving a selection of the source graphic within the recoloring tool;

receiving, via the recoloring tool, a recoloring command; and applying, responsive to the recoloring command, color information from the source color palette to the target graphic.

18. The non-transitory computer-readable storage medium of claim 14, wherein the operations further comprise:

presenting, in a recoloring tool of a graphics manipulation application, a weight modification interface element for controlling one or more weights of the source color palette;

modifying, responsive to user input to the weight modification interface element, the one or more weights of the source color palette, wherein the palette flow is computed with the one or more weights of the source color palette as modified; and generating, with the recoloring tool, a recolored target graphic that is generated from the modification to the target graphic.

19. The non-transitory computer-readable storage medium of claim 14, wherein colors of the source graphic are represented as color vectors, wherein each color vector has a luminance vector element identifying a luminance value, wherein the operations further comprise:

presenting, in a recoloring tool of a graphics manipulation application, a luminance control interface element;

modifying, responsive to user input to the luminance control interface element, a luminance control setting to exclude the luminance value of one or more colors of the source graphic from a palette-extraction process; and obtaining the source color palette from the source graphic by applying the palette-extraction process to the color vectors, wherein the applied palette extraction process excludes the luminance vector element of one or more of the color vectors.

20. The non-transitory computer-readable storage medium of claim 14, wherein the operations further comprise calculating a weight of the target color in the target color distribution from a number of pixels used to display the target color by:

creating a rasterized graphic from the target graphic;

identifying a number of pixels in the rasterized graphic having the target color; and determining the respective weight by normalizing the number of pixels with respect to a total number of pixels in the rasterized graphic.

\* \* \* \* \*